(12) United States Patent
Suzuki et al.

(10) Patent No.: US 8,415,834 B2
(45) Date of Patent: Apr. 9, 2013

(54) POWER FEEDING SYSTEM, POWER FEEDER, POWER-RECEIVING EQUIPMENT, AND POSITIONING CONTROL METHOD

(75) Inventors: Naho Suzuki, Tokyo (JP); Kazuhiro Uchida, Kanagawa (JP); Dai Sato, Saitama (JP)

(73) Assignee: Sony Corporation (JP)

(*) Notice: Subject to any disclaimer, the term of this patent is extended or adjusted under 35 U.S.C. 154(b) by 348 days.

(21) Appl. No.: 12/799,683

(22) Filed: Apr. 29, 2010

(65) Prior Publication Data
US 2010/0295378 A1 Nov. 25, 2010

(30) Foreign Application Priority Data

May 21, 2009 (JP) ................................ 2009-123178

(51) Int. Cl.
*H01F 27/42* (2006.01)
(52) U.S. Cl.
USPC ........................................................ 307/104
(58) Field of Classification Search .................. 307/104, 307/140
See application file for complete search history.

(56) References Cited

FOREIGN PATENT DOCUMENTS

| CN | 1604437 | | 4/2005 |
|---|---|---|---|
| JP | 63-059734 | A | 3/1988 |
| JP | 04-197040 | A | 7/1992 |
| JP | 06-153411 | A | 5/1994 |
| JP | 11308788 | A | 11/1999 |
| JP | 2008-301553 | A | 12/2008 |

OTHER PUBLICATIONS

Office Action from Chinese Application No. 201010180968.9, dated Jul. 30, 2012.

*Primary Examiner* — Robert L. Deberadinis
(74) *Attorney, Agent, or Firm* — Lerner, David, Littenberg, Krumholz & Mentlik, LLP

(57) ABSTRACT

A power feeding system includes: a power feeder including a mount, a primary coil, a moving means, a query output means outputting a query, a receiving means receiving notification information, a primary coil direct-current driving control means controlling the primary coil to be driven with a direct current, a query control means allowing the query output means to output a query, and a primary coil alternating-current driving control means controlling the primary coil to be driven with an alternating current; and a power-receiving equipment including a secondary coil, a sensing means disposed at a position where the sensing means can sense the query, a secondary coil direct-current driving control means controlling the secondary coil to be driven with a direct current, a notification information output means, and a secondary coil alternating-current driving control means controlling the secondary coil so that electromotive force induced by the primary coil is exerted.

20 Claims, 10 Drawing Sheets

POWER FEEDING SYSTEM, POWER FEEDER, POWER-RECEIVING EQUIPMENT, AND POSITIONING CONTROL METHOD

CROSS-REFERENCE TO RELATED APPLICATION

The present application claims priority from Japanese Patent Application No. JP 2009-123178 filed in the Japanese Patent Office on May 21, 2009, the entire content of which is incorporated herein by reference.

BACKGROUND OF THE INVENTION

1. Field of the Invention

The present invention relates to a power feeding system that performs non-contact power feeding which is represented by, for example, non-contact charging. In addition, the present invention relates to a positioning control method that is implemented in the power feeding system and is concerned with a charging position for a power feeder and power-receiving equipment.

2. Description of the Related Art

A technology for charging electronic equipment (secondary battery) in a non-contact manner has been known in the past.

For the non-contact charging, for example, a primary coil is incorporated in a charger and a secondary coil is incorporated in electronic equipment. For charging, the electronic equipment is placed at a given specified position in the charger and the primary coil is driven. Accordingly, induced electromotive force is exerted between the primary coil and secondary coil. In the electronic equipment, the induced electromotive force is used to charge a secondary battery.

In a system in which non-contact charging is performed as mentioned above, when electronic equipment is placed on a charger, the electronic equipment has to be positioned so that a state in which the distance between an internal primary coil and secondary coil falls below a certain value will be retained. In a state in which the distance between the primary coil and secondary coil is equal to or larger than the certain value, the coupling between the primary coil and secondary coil becomes insufficient. Eventually, appropriate transmission of power fails.

For the positioning, a constitution in which after a magnetic pole member of a stand is opposed to a magnetic pole member of electronic equipment, when the main body of the electronic equipment is abutted on the external surface of the stand, the electronic equipment is reliably mounted owing to attraction is described in JP-A-4-197040 (patent document 1).

As described in JP-A-63-59734 (patent document 2), a method of engaging electronic equipment with a charger by forming a physical shape such as a concave part in one of them is widely known.

JP-A-6-153411 (patent document 3) discloses a constitution in which: a rechargeable battery is disposed together with a load in a moving unit in such a manner that the battery can be moved; and when the moving unit is located at a home position, a charging power supply performs non-contact charging on the rechargeable battery.

JP-A-2008-301553 (patent document 4) discloses a constitution in which: a mirror-finished surface bearing a permissible range mark indicating the center of a primary transmission coil is formed at a position equivalent to the position of the primary transmission coil incorporated in a mount of a cradle; and a center position mark is inscribed at a position equivalent to the position of the center of a secondary transmission coil incorporated in a portable cellular phone that is equipment to be charged. In the constitution, while the center position mark of the portable cellular phone is reflected on the permissible range mark of the mount, the center position of the secondary transmission coil is matched with the center position of the primary transmission coil and the portable cellular phone is placed on the mount. Thus, the portable cellular phone is readily located at the accurate position on the mount.

SUMMARY OF THE INVENTION

In the constitution described in the patent document 1, attraction existent between magnetic pole members formed with, for example, silicon steel plates is utilized. According to the patent document 1, the attraction is exerted between the magnetic pole members, and a charging current is induced at the same time. This means that coils are driven with an alternating current in order to exert the attraction between the magnetic pole members.

However, in reality, attraction is not exerted between the magnetic pole members by driving the coils with an alternating current. Therefore, the constitution described in the patent document 1 is thought to be quite unfeasible in practice.

For example, according to the patent document 2, positioning can be readily achieved by forming physical shapes. However, in the constitution described in the patent document 2, a charger and electronic equipment have to have physical engagement facilitating shapes. Therefore, pieces of electronic equipment capable of using the charger are limited to a small number of specific models. It is hard to ensure high versatility and universality.

When an attempt is made to apply the constitution described in the patent document 3 to a typical charging system, a moving unit realized with a considerably complex mechanical facility becomes necessary. This is disadvantageous in terms of, for example, freedom in designing, cost, and a compact and lightweight design.

According to the patent document 4, the number of compatible models of equipment to be charged increases, and a universal environment is established. However, this method depends on user's visual inspection. Therefore, if a user carelessly places equipment to be charged, the position of the equipment is deviated from a proper position. If a permissible range is narrowed for some reasons, it is hard for the user to accurately position the equipment to be charged through visual inspection. The user may find it a bother and may think it is hard to use the charger.

Thus, there is a need for a power feeding system that exhibits high universality and ensures appropriate positioning without bothering a user.

According to an embodiment of the present invention, there is provided a power feeding system including a power feeder and power-receiving equipment that receives power fed from the power feeder. The power feeder includes: a mount on which the power-receiving equipment is placed; a primary coil; a moving means for making the primary coil movable; a query output means that is disposed so that the positional relationship to the movable primary coil remains unchanged, and that outputs a query to outside using a predetermined medium; a receiving means that when the query is sensed by the power-receiving equipment, receives notification information outputted from the power-receiving equipment; a primary coil direct-current driving control means that when the power-receiving equipment is placed on the mount, as long as the primary coil is made movable by the movable means, controls the primary coil so that the primary coil is driven by a direct current over a certain time length; a query control means that after driving the primary coil with a direct current is begun, allows the query output means to output a query; a primary coil alternating-current driving control means that after the notification information outputted from the power-receiving equipment in response to the query is received by the receiving means, controls the primary coil so that the primary coil can be driven with an alternating current. The power-receiving equipment includes: a secondary coil incorporated to be stationary in the power-receiving equipment; a sensing means that when the positional relationship between the primary coil and secondary coil falls within a proper range, is disposed at a position in the power-receiving equipment at which the sensing means can sense the query; a secondary coil direct-current driving control means that when the power-receiving equipment is placed on the power feeder, controls the secondary coil so that the secondary coil is driven with a direct current in order to exert attraction with respect to the primary coil which is driven with a direct current; a notification information output means that after the driving with a direct current is begun by the secondary coil direct-current driving control means, when the query is sensed by the sensing means, outputs the notification information; and a secondary coil alternating-current driving control means that after the driving with a direct current is begun by the secondary coil direct-current driving control means, when the query is sensed by the sensing means, controls the secondary coil so that electromotive force induced by the primary coil which is driven with an alternating current is exerted.

Further, according to another embodiment of the present invention, there is provided a power feeding system including a power feeder and power-receiving equipment that receives power fed from the power feeder. The power feeder includes: a mount on which the power-receiving equipment is placed; a primary coil; a moving means that makes the primary coil movable; a sensing means that is disposed so that the positional relationship to the movable primary coil remains unchanged, and that is located at a position at which when the positional relationship between the primary coil and a secondary coil incorporated in the power-receiving equipment falls within a proper range, the sensing means can sense a query outputted from the power-receiving equipment; a primary coil direct-current driving control means that when the power-receiving equipment is placed on the mount, as long as the primary coil is made movable by the moving means, controls the primary coil so that the primary coil is driver with a direct current over a certain time length; and a primary coil alternating-current driving control means that after driving the primary coil with a direct current is begun, if the query is sensed by the sensing means, controls the primary coil so that the primary coil can be driven with an alternating current. The power-receiving equipment includes: a secondary coil incorporated to be stationary in the power-receiving equipment; a query output means that outputs a query to outside using a predetermined medium so that whether the positional relationship between the primary coil and secondary coil falls within the proper range is decided; a secondary coil direct-current driving control means that when the power-receiving equipment is placed on the power feeder, controls the secondary coil so that the secondary coil is driven with a direct current over a certain time in order to exert attraction with respect to the primary coil which is driven with a direct current; a query control means that after the secondary coil is driven with a direct current by the secondary coil direct-current driving control means, allows the query output means to output a query; and a secondary coil alternating-current driving control means that after the secondary coil is driven with a direct current by the secondary coil direct-current driving control means, controls the secondary coil so that electromotive force induced by the primary coil which is driven with an alternating current is exerted.

Further, according to still another embodiment of the present invention, there is provided a power feeder including: a mount on which power-receiving equipment is placed; a primary coil; a moving means for making the primary coil movable; a query output means that is disposed so that the positional relationship to the movable primary coil remains unchanged and that outputs a query to outside using a predetermined medium; a receiving means that when the positional relationship between the primary coil and a secondary coil incorporated to be stationary in the power-receiving equipment falls within a proper range, if the query is sensed by the power-receiving equipment, receives notification information outputted from the power-receiving equipment; a primary coil direct-current driving control means that when the power-receiving equipment is placed on the mount, as long as the primary coil is made movable by the moving means, controls the primary coil so that the primary coil is driven with a direct current in order to exert attraction with respect to the secondary coil driven with a direct current in the power-receiving equipment; a query control means that after driving the primary coil with a direct current is begun, allows the query output means to output a query; and a primary coil alternating-current driving control means that after the notification information outputted from the power-receiving equipment in response to the query outputted by the query control means is received by the receiving means, controls the primary coil so that the primary coil can be driven with an alternating current.

Further, according to yet another embodiment of the present invention, there is provided power-receiving equipment including: a secondary coil incorporated to be stationary in the power-receiving equipment; a sensing means that is located at a position at which when the positional relationship between a primary coil incorporated to be movable in a power feeder and the secondary coil falls within a proper range, the sensing means can sense a query outputted from the power feeder; a secondary coil direct-current driving control means that when the power-receiving equipment is placed on the power feeder, controls the secondary coil so that the secondary coil is driven with a direct current in order to exert attraction with respect to the primary coil which is driven with a direct current in the power feeder; a notification information output means that after the driving with a direct current is begun by the secondary coil direct-current driving control means, if the query is sensed by the sensing means, outputs notification information; and a secondary coil alternating-current driving control means that after the driving with a direct current is begun by the secondary coil direct-current driving control means, if the query is sensed by the sensing means, controls the secondary coil so that electromotive force induced by the primary coil which is driven with a direct current is exerted.

Further, according to still yet another embodiment of the present invention, there is provided a power feeder including: a mount on which power-receiving equipment is placed; a primary coil; a moving means for making the primary coil movable; a sensing means that is disposed so that the positional relationship to the movable primary coil remains unchanged, and that is located at a position at which when the positional relationship between the primary coil and a secondary coil incorporated to be stationary in the power feeder falls within a proper range, the sensing means can sense the query outputted from the power-receiving equipment; a primary coil direct-current driving control means that when the power-receiving equipment is placed on the mount, as long as the primary coil is made movable by the moving means, controls the primary coil so that the primary coil is driven with a direct current over a certain time length in order to exert attraction with respect to the secondary coil driven with a direct current in the power-receiving equipment; and a primary coil alternating-current driving control means that after driving the primary coil with a direct current is begun, if the query is sensed by the sensing means, controls the primary coil so that the primary coil can be driven with an alternating current.

Further, according to further another embodiment of the present invention, there is provided power-receiving equipment including: a secondary coil incorporated to be stationary in the power-receiving equipment; a query output means that outputs a query to outside using a predetermined medium so that whether the positional relationship between the primary coil incorporated in the power feeder and the secondary coil falls within a proper range is decided; a secondary coil direct-current driving control means that when the power-receiving equipment is placed on the power feeder, controls the secondary coil so that the secondary coil is driven with a direct current over a certain time in order to exert attraction with respect to the primary coil which is driven with a direct current; a query control means that after the secondary coil is driven with a direct current by the secondary coil direct-current driving control means, allows the query output means to output a query; and a secondary coil alternating-current driving control means that after the secondary coil is driven with a direct current by the secondary coil direct-current driving control means, controls the secondary coil so that electromotive force induced by the primary coil which is driven with an alternating current is exerted.

In the foregoing constitutions, a power feeder includes a movable primary coil, and power-receiving equipment includes a secondary coil. When the power-receiving equipment is placed on the power feeder, the primary coil in the power feeder is driven with a direct current, and the secondary coil in the power-receiving equipment is driven with a direct current. Thus, attraction is exerted between the coils. Accordingly, the movable primary coil is attracted to the secondary coil, and has the position thereof varied. As a result, if a decision is made that the positional relationship between the primary coil and secondary coil has fallen within a proper range, electromotive force induced by the primary coil is exerted in the secondary coil by driving the primary coil with an alternating current. Namely, power transmission is initiated.

As mentioned above, according to the embodiments of the present invention, when power-receiving equipment is placed on a power feeder, the positions of a primary coil and a secondary coil are automatically controlled to fall within a proper range, and succeeding power feeding can be achieved appropriately. Therefore, there is provided a power feeding system that exhibits high universality and versatility and is user-friendly.

DESCRIPTION OF THE PREFERRED EMBODIMENTS

Modes for carrying out the present invention (hereinafter, embodiments) will be described by sequentially following subjects presented below.
<1. Fundamental Constitution of a Non-Contact Charging System to which the Present Invention is Applied>
<2. First Embodiment>
[1 Structure of a primary coil moving mechanism]
[2-2 System Configuration]
[2-3 Algorithm]
<3. Second Embodiment>
[3-1 Structure of a Primary Coil Moving Mechanism]
[3-2 System Configuration]
[3-3 Algorithm]
<4. Third Embodiment>
[4-1 System Configuration]
[4-2 Algorithm (First Example)]
[4-3 Algorithm (Second Example)]

1. Fundamental Constitution of a Non-Contact Charging System To which the Present Invention is Applied FIG. 1 shows the fundamental constitution of a non-contact charging system to which the present invention is applied.

Figure 1:
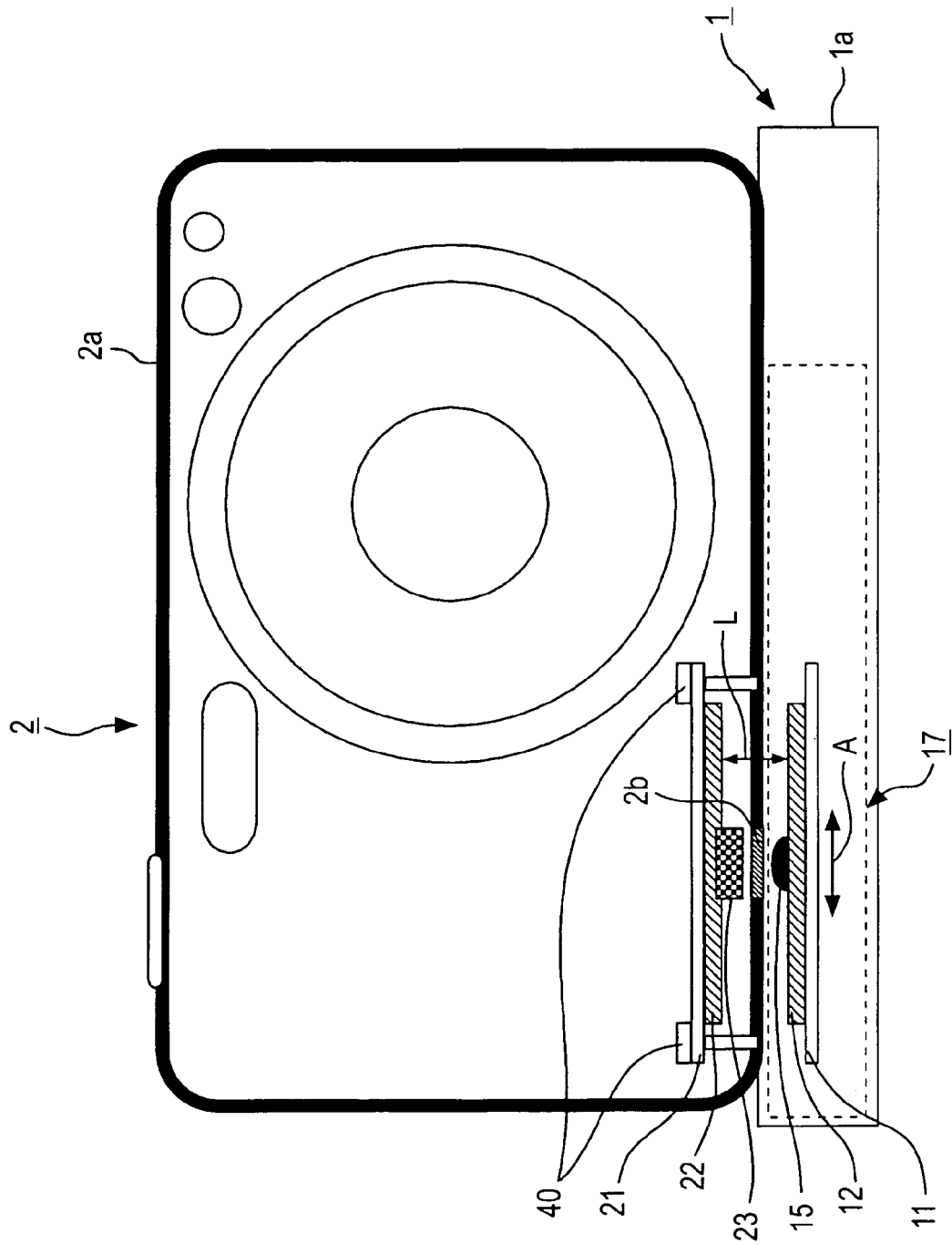
FIG. 1 is a diagram showing an example of the fundamental configuration of a non-contact charging system in accordance with an embodiment.

As shown in FIG. 1, the non-contact charging system in accordance with the embodiment includes a charger (power feeder) 1 and equipment to be charged 2 that is electronic equipment (power-receiving equipment) which operates with a secondary battery.

The equipment to be charged 2 shown herein is a digital camera but will not be limited to the digital camera.

The charger 1 inputs, for example, a mains ac voltage and feeds charging power to the equipment to be charged 2.

The equipment to be charged 2 operates with power fed from a built-in secondary battery, and the built-in secondary battery is charged with the charging power fed from the charger 1.

In the equipment to be charged 2, a secondary coil is incorporated to be stationary at a predetermined position on the bottom inside a housing 2a.

In this case, after the secondary coil 22 is attached to a substrate 21, the substrate 21 is turned upside down and fixed to the internal wall of the bottom of the equipment to be charged 2 using screws 40.

A sensor 23 is interposed between the secondary coil 22 and the internal wall of the bottom of the housing 2a. The sensor 23 shall be an optical sensor that detects incident light. In reality, the sensor 23 is attached to the substrate 21.

A light transmission part 2b is formed at a position on the bottom of the housing 2a of the equipment to be charged opposed to the position of the sensor 23, so that light coming from outside the housing 2a can enter the sensor 23. As mentioned above, when the sensor 23 receives light, if the wavelength (color) of light to be received is predesignated, the light transmission part 2b may be provided with a filtering capability for selectively transmitting light of designated color.

The charger 1 has a primary coil 12 incorporated in a housing 1a thereof.

For example, according to a related art, the primary coil 12 is incorporated to be stationary in the housing 1a.

In contrast, in the present embodiment, the primary coil 12 includes a primary coil moving mechanism 17 that is incorporated in the housing 1a of the charger 1. The primary coil 12 can therefore be moved in planar directions indicated with an arrow A. In the drawing, the arrow A indicates the directions corresponding to the sideways directions of paper. This is because the drawing is a front view. Actual planer movements include movements freely made in the directions at 360°. A structure in which a movement in a certain specific direction is restricted is not inconceivable. The primary coil moving mechanism 17 ensures a certain distance L that is long enough to permit proper transmission of power between the secondary coil and primary coil as long as the primary coil 12 is actuated.

A light emitter 15 is disposed on the upper side of the primary coil 12. The light emitter 15 is attached to a substrate 11. Light emanating from the light emitter 15 is irradiated to outside via a light transmission part of the upper side of the housing 1a, though it is not shown in the drawing.

The light emitter 15 can be moved together with the primary coil 12 by the primary coil moving mechanism 17 while being fixed to the substrate 11. Therefore, the light transmission part of the housing 1a is preferably shaped to have a size that is large enough to cover a movable range within which the light emitter 15 is movable in the planar directions. When the wavelength (color) of light is predesignated, the light transmission part of the charger 1 may have the filtering capability for selectively transmitting the light of the designated color.

A power circuit that produces a current which flows into the primary coil and uses a mains ac power supply as a power source, and a control unit that includes a control processing unit (CPU) and implements internal control are incorporated in the charger 1, though they are not shown.

In the present embodiment, the primary coil 12 and secondary coil 22 may be shaped like, for example, a winding or a sheet.

In the foregoing constitution, non-contact charging is carried out as described below.

The equipment to be charged 2 shall be mounted on the charger 1. The primary coil 12 of the charger 1 and the secondary coil 22 of the equipment to be charged 2 shall have a distance L, which falls within a permissible range, between them. A deviation in a planar direction of the position of the primary coil from the position of the secondary coil shall fall within a permissible range within which power necessary for charging can be transmitted.

In the foregoing state, in the charger 1, the primary coil 12 is driven with an alternating current. In other words, a defined amount of alternating current to be used for charging is routed to the primary coil 12. Accordingly, an ac magnetic flux is induced in the primary coil 12, and induced electromotive force is exerted in the secondary coil 22. Namely, power is transmitted from the charger 1 to the equipment to be charged 2 by way of the primary coil 12 and secondary coil 22. In the equipment to be charged 2, charging power, for example, a constant current is produced owing to the induced electromotive force exerted in the secondary coil, and fed to the secondary battery. That is, the secondary battery is charged.

According to the related art, when the equipment to be charged 2 is placed on the charger 1, the foregoing charging actions are initiated immediately.

In contrast, according to the present embodiment, when the equipment to be charged 2 is placed on the charger 1, the primary coil 12 and secondary coil 22 are controlled so that a positional deviation in a planar direction falls within a permissible range. In other words, the primary coil 12 is controlled to be positioned with respect to the secondary coil 22.

Therefore, the charger 1 begins driving the primary coil 12 with a direct current with the primary coil 12 made movable by the primary coil moving mechanism 17. Namely, a direct current is caused to flow but an alternating current is not.

Concurrently, the equipment to be charged 2 begins driving the secondary coil 22 with a direct current.

At this time, the polarities of currents that flow into the primary coil 12 and secondary coil 22 respectively are designated so that magnetic fields is induced to cause attraction to be exerted between them.

As mentioned above, both the primary coil 12 and secondary coil 22 are driven with a direct current so that attraction is exerted between the primary coil 12 and secondary coil 22. The primary coil 12 that is made movable by the primary coil moving mechanism 17 is attracted to the position of the secondary coil 12. A positioning control algorithm will be detailed later. Anyway, the positional deviation in a planar direction finally falls within the permissible range.

If a decision is made that the positional deviation in any planar direction has fallen within the permissible range, the positioning actions are switched to the aforesaid charging actions. Namely, the primary coil 12 being driven with a direct current is now driven with an alternating current, and the secondary coil 22 is set to a state in which the secondary coil can receive power transmitted from the primary coil 12.

Since positioning is performed as mentioned above, the necessity of designing the charger 1 and equipment to be charged 2 so that they have physical engagement or fitting facilitating shapes for the purpose of positioning is obviated. Therefore, limitations to be imposed on the equipment to be charged 2, which can be charged by the charger 1, in terms of the shape are alleviated. The universality of the charger 1 is improved.

According to the present embodiment, the primary coil incorporated in the charger 1 is moved in order to automatically achieve positioning. Accordingly, when a user places the equipment to be charged 2 on the charger 1, the user is not requested to place the equipment to be charged as accurately as that requested in the patent document 4. Namely, a charging system in which even when the equipment to be charged 2 is placed somewhat carelessly, the equipment to be charged 2 is properly charged can be provided, and can be easily dealt with by the user. Even when a guide or the like helping place the equipment to be charged 2 is inscribed on the charger 1, freedom in designing expands.

2. First Embodiment

[2-1 Structure of the Primary Coil Moving Mechanism]

Next, a first embodiment will be described below.

Figure 2:
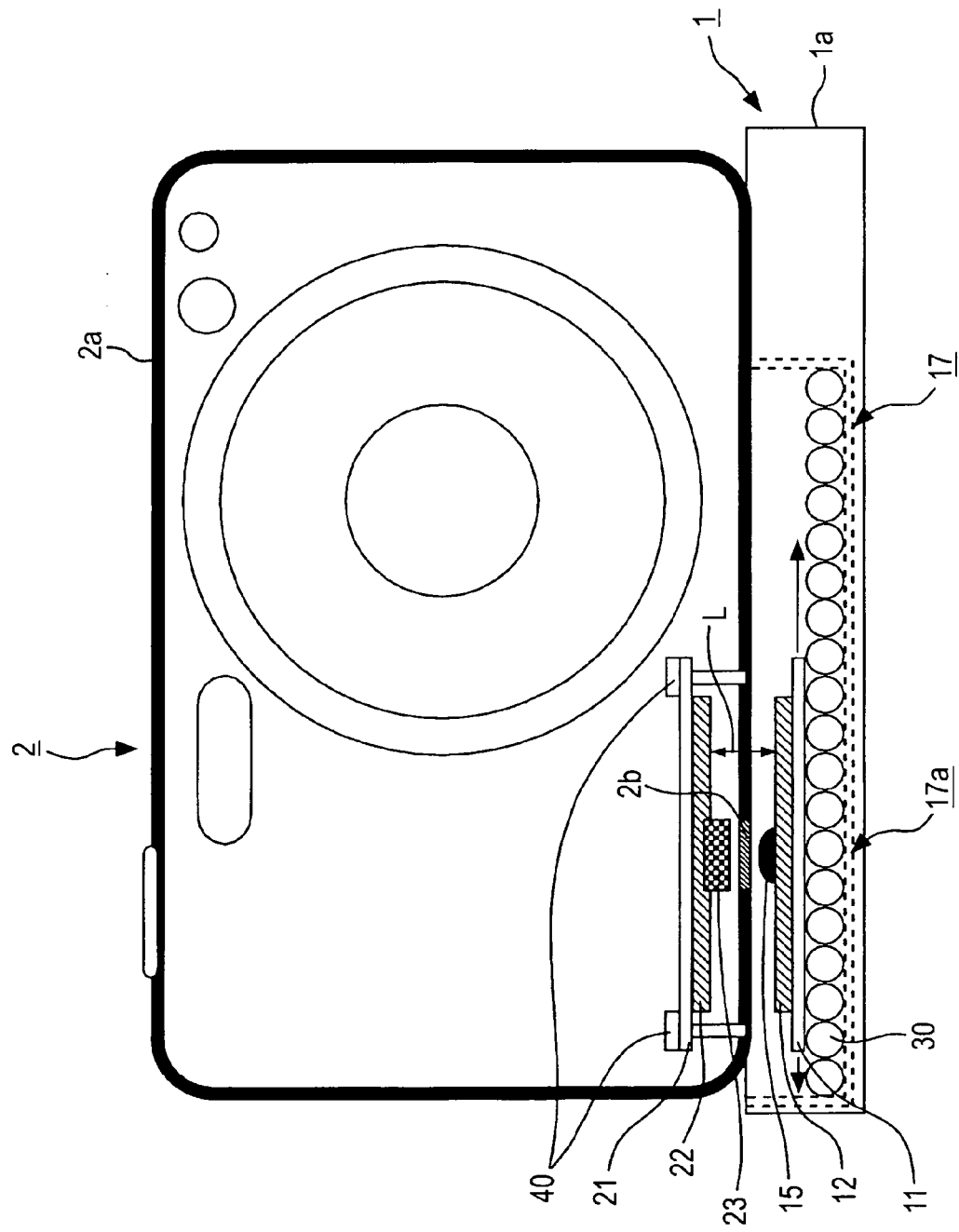
FIG. 2 is a diagram showing a concrete example of a primary coil moving mechanism, and a charger and equipment to be charged in accordance with a first embodiment.

FIG. 2 shows the charger 1 and equipment to be charged 2 in accordance with the first embodiment. In the first embodiment, the primary coil moving mechanism 17 has a structure that will be concretely described below.

In the primary coil moving mechanism 17 shown in FIG. 2, a movable member bearing region is structured as a spherical-pieces layer 17a.

The spherical-pieces layer 17a is formed by, for example, juxtaposing numerous spherical pieces 30, which have a predetermined diameter, in planar directions.

The substrate 11 to which the primary coil 12 is attached is placed on the spherical-pieces layer 17a. At this time, a distance L that is long enough to ensure necessary and sufficient magnetic coupling is preserved between the primary coil 12 and the secondary coil 22 incorporated in the equipment to be charged 2.

For forming the spherical-pieces layer 17a, spherical pieces may be laid down nearly all over a disposition space for the spherical pieces 30. Alternatively, the number of spherical pieces 30 exhibiting a certain density or less in the disposition space may be placed so that the spherical pieces 30 can somewhat freely roll. The latter is more preferable from the viewpoint of, for example, minimizing friction against the substrate 11 to which the primary coil 12 is attached.

The material of the spherical pieces 30 is not limited to any specific one, but may be a ceramic, glass, or a resin. A material that minimizes the friction of the surface of each of the spherical pieces 30 is preferred. Owing to the adoption of such a material, not only the contact parts of the spherical pieces with respect to the substrate 11 become points but also the substrate 11 can be moved on the spherical-pieces layer 17a in the planar directions with the friction against the substrate nearly ignored.

The side of the substrate 11 that comes into contact with the spherical-pieces layer 17a has to be finished as, for example, a smooth plane.

[2-2 System Configuration]

Figure 3:
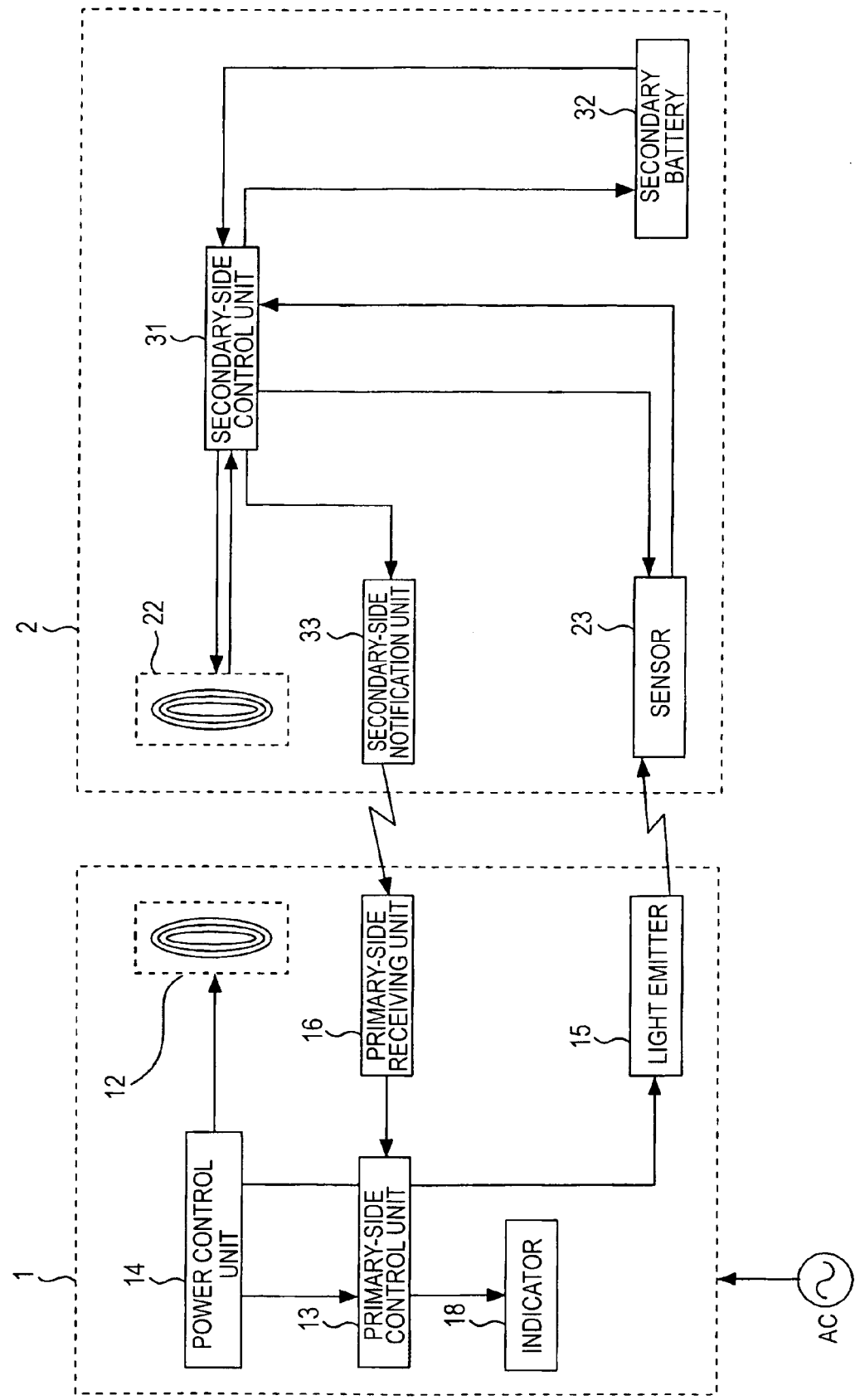
FIG. 3 is a block diagram showing an example of a system configuration for the charger and equipment to be charged in accordance with the first embodiment.

FIG. 3 shows an example of a system configuration for the charger 1 and equipment to be charged 2 in accordance with the first embodiment.

The charger 1 is shown to include, in addition to the primary coil 12, a primary-side control unit 13, a power control unit 14, a light emitter 15, a primary-side receiving unit 16, and an indicator 18.

The primary-side control unit 13 includes, for example, a CPU and memories such as a RAM and a ROM (or a flash memory), and autonomously implements control in the charger 1.

The power control unit 14 controls driving of the primary coil 12 in response to an instruction given by the primary-side control unit 13.

The light emitter 15 is, as shown in FIG. 2, physically incorporated to be stationary at, for example, a position closest to the bottom of the housing 2a while being attached to the substrate 21. The light emitter 15 is driven to emit light by the primary-side control unit 13.

The light emitter 15 is, in practice, realized with a light-emitting diode, a phototransistor, or a laser element.

Light emanating from the light emitter 15 is, as seen from a description to be made later, an output (a query) to be used to decide whether the positional relationship between the primary coil 12 and secondary coil 22 falls within a proper range. The reason why light is adopted as the medium that carries the query is that light is not incorrectly sensed while being adversely affected by magnetic fluxes induced by driving the primary coil 11 and secondary coil 22.

The primary-side receiving unit 16 is a region that receives a signal which is transmitted wirelessly from a secondary-side notification unit 33 to be described later and which acknowledges receipt of light. On receipt of the signal, the primary-side receiving unit 16 notifies the primary-side control unit 13 of the fact.

The indicator 18 has, for example, a certain number of light-emitting elements, which have different colors, bared on the housing 1a so that a user can discern the emitted light.

The primary-side control unit 13 selects any of the colors of the light-emitting elements according to an operating state to be notified, and drives the light-emitting element of the selected color as the indicator 18. A user sees the thus displayed indicator 18 so as to learn the operating state of the charging system.

In this case, the charger 1 operates with a mains ac voltage AC.

As for the configuration of the equipment to be charged 2, there are shown, in addition to the secondary coil 22, a secondary-side control unit 31, a secondary battery 32, a sensor 23, and a secondary-side notification unit 33.

The secondary-side control unit 31 includes a microcomputer which includes a CPU and memories such as a RAM and a ROM (or a flash memory), and a power control circuit, and can implement control in charging actions to be performed in the equipment to be charged.

The equipment to be charged 2 has, as shown in FIG. 3, the secondary battery 32 incorporated therein, and can operate with dc power fed from the secondary battery 32. In this case, the secondary-side control unit 31 inputs induced electromotive force exerted in the secondary coil 22 so as to produce a charging current, and feeds the charging current to the secondary battery 32. Thus, the secondary battery 32 is charged. In this case, the secondary-side control unit 31 can sense the amount of charge, which is stored in the secondary battery 32, on the basis of the voltage across the secondary battery 32. When sensing that the secondary battery 32 is fully charged, the secondary-side control unit 31 discontinues conduction of a current to the secondary coil 22 so as to cease driving. This prevents the fully-charged secondary battery 32 from being further charged.

The sensor 23 is a region that receives and detects light emanating from the light emitter 15 of the charger 1. As the sensor 23, various light detecting elements including, for example, a phototransistor can be adopted.

The sensor 23 can operate with conduction of a current from, for example, the secondary-side control unit 31. A detection signal the sensor 23 outputs after sensing light is fetched by the secondary-side control unit 31.

The secondary-side notification unit 33 is a region that, under the control of the secondary-side control unit 31, wirelessly notifies in a non-contact manner the primary-side receiving unit 16 of the charger 1 of the fact that the sensor 23 of the equipment to be charged 2 has sensed light.

For transmitting a signal from the primary-side receiving unit 16 to the secondary-side notification unit 33, for example, a pulse, a frequency-modulated wave, or light may be adopted as the signal. These media are unsusceptible to or are not affected by magnetic fluxes induced by coils. The media other than light may be adopted as an intermediary between the light emitter 15 and sensor 23.

Conceivably, one communication unit having the capabilities of the light emitter 15 and primary-side receiving unit 16 may be included in the charger 1, and one communication unit having the capabilities of the sensor 23 and secondary-side communication unit may be included in the equipment to be charged 2, so that the communication units may communicate with each other.

[2-3 Algorithm]

Figure 4:
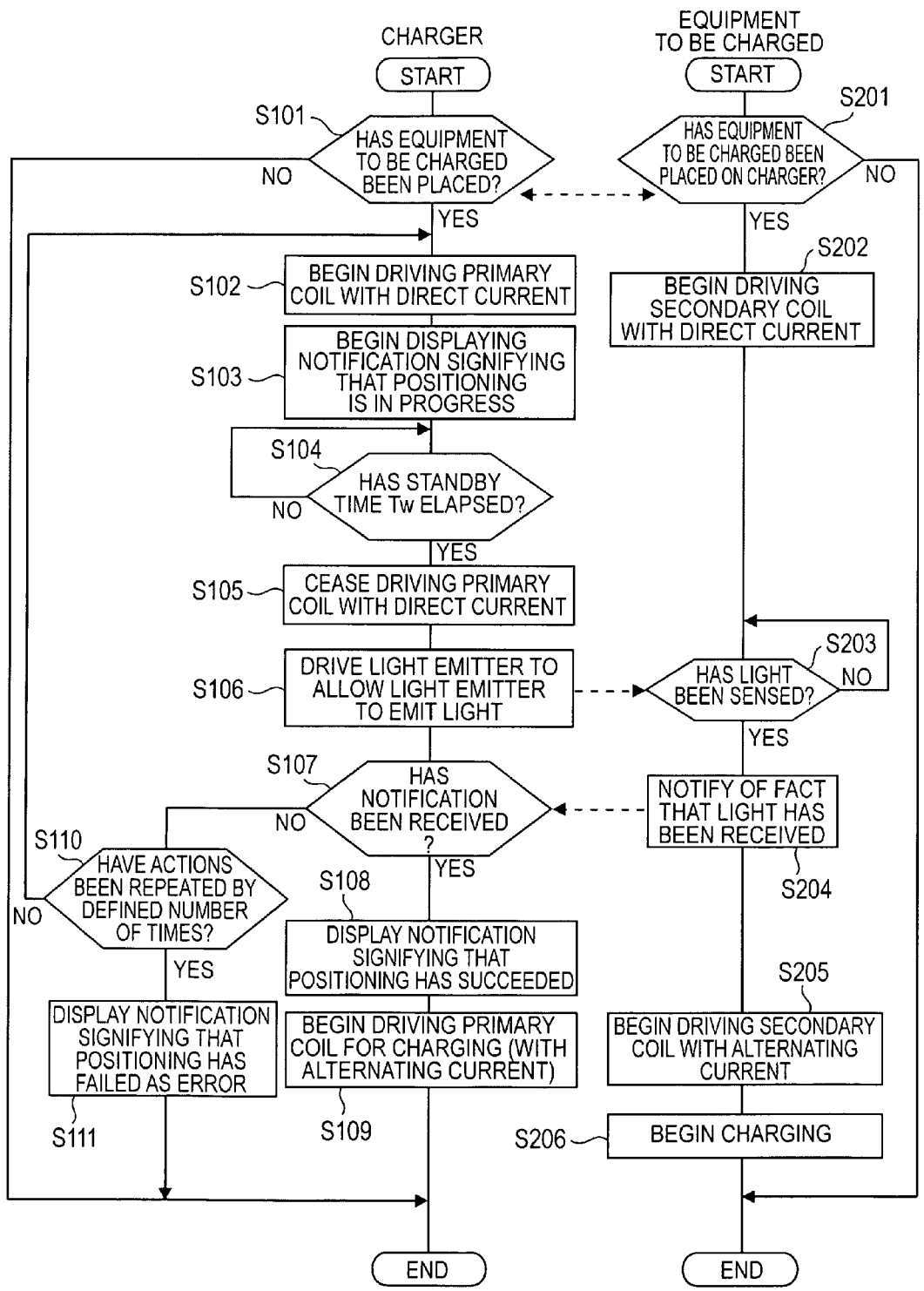
FIG. 4 is a flowchart showing an example of a processing procedure for primary-coil positioning control to be executed by the charger and equipment to be charged in accordance with the first embodiment.

The flowchart of FIG. 4 shows an example of a processing procedure to be followed by the charger 1 and the equipment to be charged 2 for the purpose of positioning control concerning a charging position (the position of the primary coil 12) prior to beginning of charging. The pieces of processing described in the chart may be regarded as pieces of processing which the CPU serving as the primary-side control unit 13 of the charger 1 and the CPU serving as the secondary-side control unit 31 of the equipment to be charged 2 execute according to programs. The program data items may be stored and preserved in, for example, a recording medium, or may be preserved at a server on a network.

In the charger 1, the primary-side control unit 13 decides at step S101 whether the equipment to be charged 2 is placed on the charger 1. For the decision making, a mechanical switch to be depressed when the equipment to be charged 2 is placed, or a sensor that is realized with a piezoelectric element and senses a change in a pressure occurring due to the weight of the equipment to be charged 2 when the equipment to be charged 2 is placed is included. Otherwise conceivable is a constitution in which, light is irradiated to outside by a light-emitting element, and light reflected from the equipment to be charged 2 when the equipment to be charged 2 is placed is detected by an optical sensor. A decision is made based on the output of the switch or sensor.

If a decision is not made at step S101 that the equipment to be charged 2 has been placed, for example, the processing described in the drawing may be abandoned, and step S101 may be resumed at the right timing.

In contrast, if a positive result of decision is obtained at step S101 because the equipment to be charged 2 has been placed, the primary-side control unit 13 proceeds to a procedure beginning at step S102.

Herein, the region (mount) of the charger 1 on which the equipment to be charged 2 is placed shall not be designed to, for example, have a physical engagement facilitating shape so as to strictly restrict the mounting position of the equipment to be charged 2 on the charger 1. For example, an alignment mark or the like is not intended to strictly indicate a position but is an indication that tolerates a deviation to some extent. According to the present embodiment, when a user places the equipment to be charged 2 on the charger 1, the user may not strictly be conscious of the position. The charger 1 is easy to handle. In addition, if the charger is, for example, flattened at a position at which the equipment to be charged 2 is placed, the universality and versatility thereof would improve.

The shape or design of the region of the charge on which the equipment to be charged 2 is placed may be varied depending on the shape or design of the equipment to be charged 2 or a range within which the charger has to be versatile. The freedom in determining the shape or design is highly expandable. Therefore, introduction of a concrete example will be omitted.

As long as the aforesaid form of a mount is adopted, when a positive result of decision is obtained because the equipment to be charged 2 has been placed, a deviation in a planar direction of the position of the primary coil 12 from the position of the secondary coil 22 may exceed a permissible range (proper range). In the present invention, positioning is, as described later, controlled in order to correct the positional deviation.

At step S102, the primary-side control unit 13 causes driving of the primary coil 12 with a direct current to begin. Namely, the primary-side control unit 13 allows an action of feeding a predetermined amount of direct current to the primary coil 12 to begin.

Along with the beginning of the driving with a direct current at step S102, the primary-side control unit 13 drives the light-emitting element included in the indicator 18 according to a pattern for a predetermined color or a light-emitting pattern (for example, lighting or flickering) so that a notification signifying that the position of the primary coil (charging position) is being determined will be displayed.

Thereafter, at step S104, the primary-side control unit 13 stands by until a standby time Tw elapses. During a period during which the primary-side control unit 13 stands by at step S104, driving the primary coil 12 with a direct current at step S102, and a notification signifying that positioning is in progress is still displayed as it is at step S103. If a decision is made at step S104 that the standby time Tw has elapsed, the primary-side control unit 13 proceeds to step S105.

At step S105, the primary-side control unit 13 ceases the driving of the primary coil 12 with a direct current. For ceasing the driving with a direct current, for example, conduction of a direct current for driving to the primary coil 12 is discontinued.

While the processing of step S105 is in progress, the primary-control unit 13 executes driving of the light emitter 15 at step S107 so as to cause the light emitter 15 to emit light. For driving the light emitter 15 to cause the light emitter 15 to emit light at step S107, for example, when a certain time (for example, two or three sec at most) has elapsed since the light emitter 15 is allowed to begin emitting light, the light emission is ceased.

As for another way of causing the light emitter 15 to emit light, the light emitter 15 may be allowed to begin emitting light at step S107, and the light emission may be continued until a positive result of decision is obtained at step S107 because positioning has succeeded. However, in this case, since the time during which the light emitter 15 is allowed to emit light is long, the power consumption increases. Especially, although the light emitter 15 exhibiting a sharp directivity angle is advantageous, as the directivity angle gets larger, a light-emitting diode or the like employed in the light emitter 15 is requested to offer high luminance. Higher luminance leads to higher power consumption. Light emanating from the light emitter 15 has to pass through two light transmission parts, that is, the light transmission part of the charger 1 and the light transmission part 2b of the equipment to be charged 2. The high luminance is requested in consideration of attenuation in light intensity derived from passage through the two light transmission parts.

In consideration of the foregoing matters, the light emission time during which the light emitter 15 emits light at step S107 is set to a short time in this embodiment. Although the light emitter 15 is driven to emit light for the short time, the time during which light is sensed in the equipment to be charged 2 includes the light emission time for the light emitter 15 or is set to a time longer than the light emission time. Therefore, once positioning succeeds, light can be properly sensed.

In the equipment 2 to be charged, the secondary-side control unit 31 decides at step S201 whether the equipment to be charged 2 has been placed on the charger 1. For the decision, similarly to that in the charger 1, a mechanical switch or sensor is included in the equipment to be charged 2. The output of the switch or sensor is used to make a decision.

If a negative result of decision is obtained at step S201 because the equipment to be charged 2 has not been placed on the charger 1, the secondary-side control unit 31 terminates the pieces of processing described in the drawing, and resumes step S201 at the right timing.

In contrast, if a positive result of decision is obtained because the equipment to be charged 2 has been placed, the secondary-side control unit proceeds to step S202 or a subsequent step.

At step S202, the secondary-side control unit 31 causes driving of the secondary coil with a direct current to begin.

In this case, the timing at which a positive result of decision is obtained at step S101 in the charger 1 is thought to coincide with the timing at which a position result of decision is obtained at step S201 in the equipment to be charged 2. Accordingly, the timing at which driving the primary coil 12 with a direct current is begun at step S102 in the charger 1 is thought to coincide with the timing at which driving the secondary coil with a direct current is begun at step S202 in the equipment to be charged 2.

In the charger 1, driving the primary coil 12 with a direct current is continued over the time length of the standby time Tw at step S104 after the driving is begun at step S102. The equipment to be charged 2 begins driving the secondary coil 22 with a direct current at step S202. Therefore, the secondary coil 22 is still driven with a direct current during the time interval corresponding to the standby time Tw.

When a direct current is caused to flow into a coil, magnetic force is induced with the polarity thereof fixed based on the polarity of the direct current. In the present embodiment, the polarity of a direct current with which the primary coil 12 is driven at step S102, and the polarity of a direct current with which the secondary coil 22 is driven at step S202 are determined so that attraction is exerted by the magnetic force induced by the primary coil and the magnetic force induced by the secondary coil 22.

Therefore, the primary coil 12 and secondary coil 22 are attracted to each other. Specifically, the secondary coil is held stationary in the housing 2a, while the primary coil 12 is movable in the planar directions within the housing 1a owing to the primary coil moving mechanism 17. Therefore, when the primary-side control unit stands by over the standby time Tw at step S104, the primary coil 12 is moved to the position of the secondary coil 22 while being attracted to the secondary coil 22. The movement may be regarded as a movement for correcting the positional relationship in a planar direction between the primary coil 12 and secondary coil 12 for the purpose of improving the transmission efficiency.

When the standby over the standby time Tw is completed at step S104, the charger 1 discontinues conduction of a current so as to cease driving of the first coil 12 with a direct current at step S105. Therefore, even when the secondary coil 22 is kept driven with a direct current, since the primary coil 12 does not have transmission power. Therefore, the primary coil 12 neither induces magnetic force of fixed polarity nor functions as a magnet. Therefore, neither attraction nor repulsion is exerted between the primary coil 12 and secondary coil 22.

For example, when attraction is exerted between the primary coil 12 and secondary coil 22, the primary coil 12 is recognized as being movable anytime due to the attraction to the secondary coil. In the present embodiment, after the primary coil 12 is made movable over a certain time corresponding to the standby time Tw, conduction of a current to the primary coil 12 is discontinued at step S105 in order to nullify the attraction. The position of the primary coil 12 is finalized.

In the charger 1, attraction is canceled as mentioned above, and the position of the primary coil 12 is finalized. In this state, the light emitter 15 emits light at step S107.

In the equipment to be charged 2, the secondary-side control unit 31 causes driving of the secondary coil with a direct current to begin at step S202. At step S203, the secondary-side control unit 31 stands by until the sensor 23 senses light.

In the charging system of the present embodiment, a degree of magnetic coupling between the primary coil 12 and secondary coil 22 that is high enough to achieve proper charging is attained when: the primary coil 12 and secondary coil 22 have such a positional relationship that the distance L shown in FIG. 1 is preserved; and a proper range (permissible range) of values of a deviation of a center of a magnetic flux (center of a coil) in a planar direction is 4 mm or less.

Accordingly, the present embodiment is structured so that unless the deviation in a planar direction of the position of the primary coil 12 from the position of the secondary coil 22 falls within 4 mm, light emanating from the light emitter 15 is not effectively detected by a photo-receiver after entering through the light transmission part 2b of the equipment to be charged 2.

The foregoing structure is realized by adjusting, for example, the directivity angle of light emanating from the light emitter 15, the size or shape of the light transmission part 2b, or the directivity angle of light received by the sensor 23.

When the light emitter 15 is caused to emit light at step S107, if the primary coil 12 is located at a distance of 4 mm or less from the secondary coil 22, the sensor 23 can sense light emanating from the light emitter 15. The detection output is fed to the secondary-side control unit 31. Accordingly, the secondary-side control unit 31 obtains a positive result of decision at step S203, and proceeds to step S204.

At step S204, the secondary-side control unit 31 controls the secondary-side notification unit 33, and allows the secondary-side notification unit 33 to transmit a signal notifying that the equipment to be charged 2 has received light emanating from the light emitter 15.

In contrast, when the light emitter 15 is caused to emit light at step S107, if the deviation in a planar direction of the position of the primary coil 12 from the position of the secondary coil 22 exceeds 4 mm, the sensor 23 fails to sense light emanating from the light emitter 15. In this case, a negative result of decision is obtained at step S203. The secondary-side control unit 31 stands by until light is sensed.

In the charger 1, the primary-side control unit 13 drives the light emitter 15 so as to allow the light emitter 15 to emit light at step S106, and then proceeds to step S107. At step S107, the primary-side control unit 13 decides whether a notification signifying that light has been received and being transmitted at step S204 has been received by the primary-side receiving unit 16.

If a negative result of decision is obtained because a notification signifying that light has been received has not been received at step S107, the primary-side control unit 13 proceeds to step S110 or a subsequent step.

When a negative result of decision is obtained at step S107, it means that: the primary coil 12 and secondary coil 22 are made electromagnetic over the time length of the standby time Tw at step S102 to step S104 and step S202; and the primary coil 12 is attached to the secondary coil 22 and thus made movable; but the deviation of the position of the primary coil 12 from the position of the secondary coil 22 does not fall within the permissible range.

In this case, at step S110, whether the number of times of repetition by which actions are repeated at step S102 to step S104 has reached a defined number of times is decided. If a negative result of decision is obtained, the primary-side control unit 13 returns to step S102.

Accordingly, the primary coil 12 is driven with a direct current during the period corresponding to the standby time Tw. At this time, in the equipment to be charged 2, driving the secondary coil 22 with a direct current is continued after it is begun at step S202.

Therefore, attraction is exerted between the primary coil 12 and secondary coil 22 during the period corresponding to the standby time Tw. The primary coil 12 is thus made movable while being attached to the secondary coil 22. Thereafter, driving the primary coil 12 with a direct current is ceased at step S105 and the light emitter 15 is driven to emit light at step S107. Eventually, the primary coil 12 approaches the secondary coil 22, and the position of the primary coil 12 is thus shifted.

As mentioned above, in the present embodiment, actions to be performed to drive the primary coil 12 and secondary coil 12 with a direct current over the certain time (Tw) for the purpose of making the coils electromagnetic so that the coils is attracted to each other are repeated in order to establish a state in which the deviation in a planar direction of the position of the primary coil 12 from the position of the secondary coil 22 falls within the permissible range.

As a result of repetition of the actions, the deviation in a planar direction of the position of the primary coil 12 from the position of the secondary coil 22 falls within the permissible range at a certain step. Light emanating from the light emitter 15 is then received by the sensor 23. As a result, a positive result of decision is obtained at step S107.

If a positive result of decision is obtained at step S107, the primary-side control unit 13 proceeds to step S108 or a subsequent step.

At step S108, the primary-side control unit 13 controls the indicator 18 so that the fact that positioning control has succeeded is notified. Concurrently, at step S110, the primary-side control unit 13 causes the driving of the light emitter 15, which has been carried on for light emission, to cease.

At step S109, the primary-side control unit 13 causes driving of the primary coil 12 with an alternating current to begin according to an amount of current and a frequency corresponding to those employed in the charging actions. Namely, the primary-side control unit 13 feeds an alternating current to the primary coil 12 by the defined amount of current at the defined frequency.

For example, as the timing of driving the primary coil 12 with an alternating current, the timing other than the timing succeeding the success in positioning achieved at step S108 is conceivable. For example, at a step succeeding step S105 at which driving the primary coil 12 with a direct current is ceased, the driving with a direct current may be switched to driving with an alternating current. In other words, the driving with a direct current is switched to the driving with an alternating current at a step preceding the success in positioning. However, power is not appropriately transmitted until positioning succeeds. Meanwhile, driving the primary coil 12 with an alternating current is insignificant. In the algorithm shown in FIG. 4, consideration is taken into this point. Namely, the primary coil is not driven with an alternating current until positioning succeeds. Therefore, for example, the power consumption caused by the driving with an alternating current to be performed at the step preceding the success in positioning can be avoided.

In the equipment to be charged 2, the secondary-side control unit 31 senses light at step S203 and notifies at step S204 of the fact that light has been received. Thereafter, at step S205, the secondary-side control unit 31 drives the secondary coil 22 with an alternating current. Therein, when it says that the secondary coil 22 is driven with an alternating current, it means that a current is conducted to the secondary coil 22 so that electromotive force induced by driving the primary coil 12 with an alternating current is exerted in the secondary coil 22.

At this time, in the charger 1, driving the primary coil 12 with an alternating current for charging has begun. Therefore, when the secondary coil 22 is driven with an alternating current at step S205, induced electromotive force is exerted. At step S206, the secondary-side control unit 31 initiates the action of inputting the induced electromotive force from the secondary coil 22 so as to produce a charging current and feed the charging current to the secondary battery. In short, the secondary-side control unit 31 begins charging the secondary battery 32.

Along with the beginning of charging, at least one of the charger 1 and equipment to be charged 2 should begin displaying a notification indicating that charging is in progress. However, an amount of charge stored in the secondary battery 32 can be identified by the equipment to be charged 2. Therefore, when the equipment to be charged 2 displays the notification signifying that charging is in progress, the series of actions is completed by the equipment to be charged 2. For example, a progress of increasing the amount of charge can be indicated, or a notification signifying completion of charging can be displayed.

As described previously, in the present embodiment, a charging-position correcting action is repeated by repeatedly exerting attraction with magnetic forces induced by the primary coil 12 and secondary coil 22 over a certain time (Tw) in order to attract the primary coil 12 to the secondary coil 22.

However, in some cases, even if the charging-position correcting action is repeated many times, the deviation in a planar direction of the position of the primary coil 12 from the position of the secondary coil 22 does not fall within the permissible range for some reason.

In this case, the number of times of repetition by which returning from step S110 to step S102 is repeated reaches a defined number of times. A positive result of decision is therefore obtained at step S110. The processing of step S111 is therefore carried out.

At step S111, the primary-side control unit 13 drives the indicator 18 so that the fact that positioning control has failed (error) is notified.

For example, assume that the indicator 18 displays a notification signifying that positioning has failed and a user has recognized the fact. In this case, for example, the user lifts the equipment to be charged 2 apart from the charger 1, and then re-places the equipment to be charged 2 on the charger 1. This causes the charger 1 (primary-side control unit 13) and equipment to be charged 2 (secondary-side control unit 31) to resume the pieces of processing beginning at step S101 or step S201. Namely, positioning control is executed again.

In the present embodiment, a period during which the primary coil 12 and secondary coil 22 are concurrently driven with a direct current is defined for positioning control. Therefore, in the present embodiment, unlike, for example, the patent document 1, attraction can be reliably exerted between the primary coil 12 and secondary coil 22. If a decision is made that the deviation of the position of the primary coil 12 from the position of the secondary coil 22 falls within the permissible range through positioning control, the driving with a direct current is switched to driving with an alternating current, and charging actions are initiated appropriately.

3. Second Embodiment

[3-1 Structure of a Primary Coil Moving Mechanism]

Figure 5:
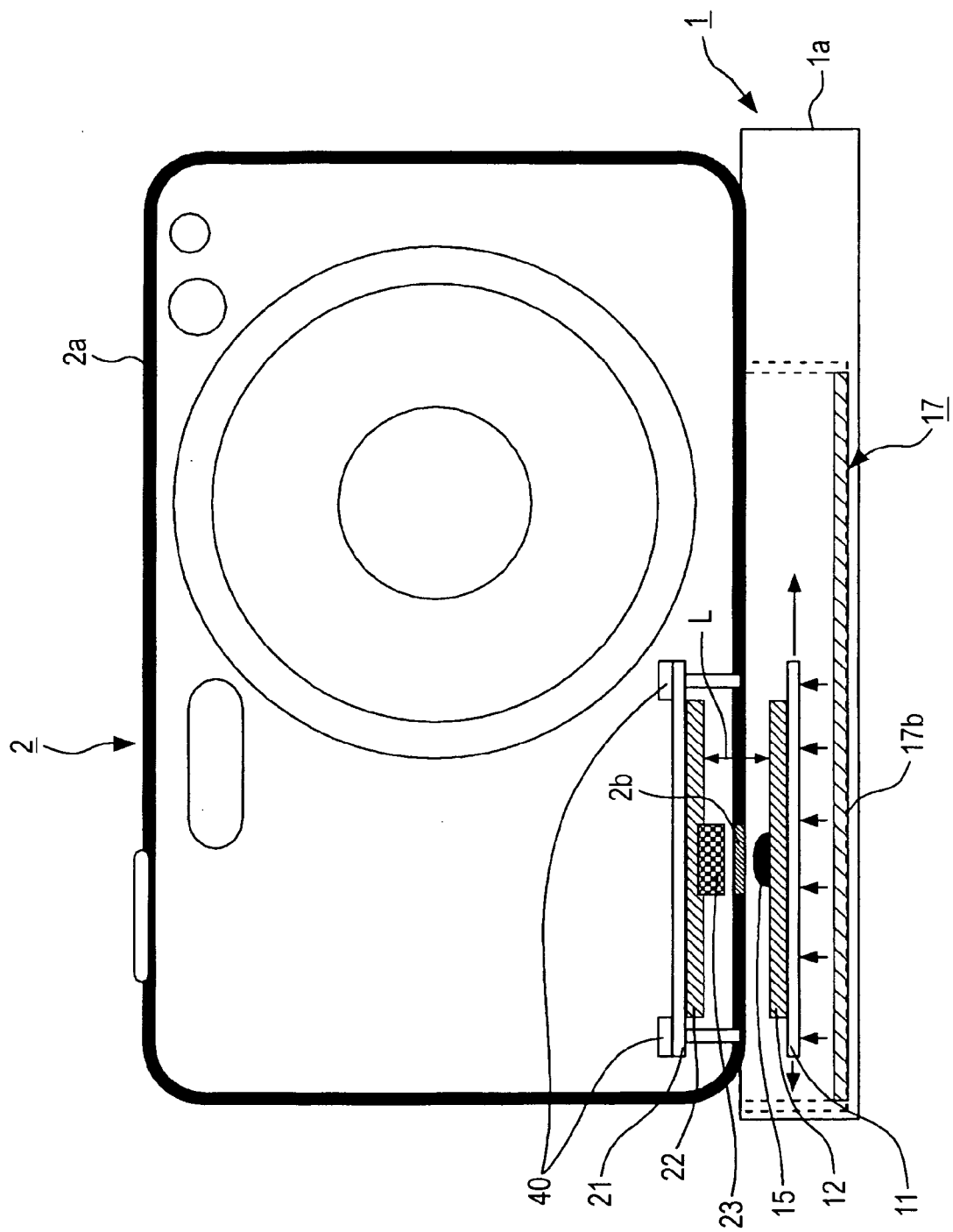
FIG. 5 is a diagram showing a concrete example of a primary coil moving mechanism, and a charger and equipment to be charged in accordance with a second embodiment.

FIG. 5 shows the charger 1 and equipment to be charged 2 included in a non-contact charging system in accordance with the second embodiment. In the drawing, the same reference numerals are assigned to components identical to those shown in FIG. 1 and FIG. 2. An iterative description will be omitted.

In the second embodiment, the primary coil moving mechanism 17 has a structure described below. Specifically, as illustrated, the primary coil moving mechanism 17 has the structure that an electromagnet 17b is disposed as a movable member bearing region below the substrate 11 to which the primary coil 12 is attached.

In order to make the primary coil 12 movable using the primary coil moving mechanism 17, the primary coil 12 is driven with a direct current so that the primary coil 12 induces magnetic force, and a current is conducted to the electromagnet 17b so that the electromagnet 17b induces magnetic force. At this time, the polarity of the magnetic force induced by the primary coil 12 and the polarity of the magnetic force induced by the electromagnet 17b are determined so that repulsion is exerted between the primary coil and electromagnet 17b. The primary coil 12 and electromagnet 17b are thus driven.

Since the repulsion is exerted between the primary coil 12 and electromagnet 17b, the substrate 11 to which the primary coil 12 is attached nearly floats above the surface of the electromagnet 17b. When the substrate 11 to which the primary coil 12 is attached floats, the lower-side surface of the substrate 11 hardly generates friction against the surface of the electromagnet 17b. Therefore, the primary coil 12 attached to the substrate 11 becomes movable in planar directions.

Preferably, the electromagnet 17b has a size and a shape permitting the substrate 11, to which the primary coil 12 is attached, to float due to the repulsion over a movable range within which the primary coil 12 is movable in the planar directions.

For positioning control, as mentioned above, repulsion is exerted between the primary coil 12 and electromagnet 17b in order to make the primary coil 12 movable. Concurrently, a direct current having the polarity that causes attraction to be exerted with respect to the primary coil 11 is, similarly to that in the first embodiment, fed to the secondary coil 12, whereby the secondary coil is driven with the direct current.

In this state, the primary coil 12 moves to approach the secondary coil 12. Namely, the primary coil 12 is aligned with the secondary coil 12.

FIG. 5 explicitly shows a state in which the substrate 11 to which the primary coil 12 is attached floats due to the repulsion exerted with respect to the electromagnet 17b. However, in reality, even when the substrate 11 floats due to the repulsion, the distance between the upper-side surface of the electromagnet 17b and the lower-side surface of the substrate 17 which are opposed to each other is very short.

In consideration of the above description, the surfaces of the electromagnet 17b and substrate 11 which are opposed to each other are preferably finished as smooth surfaces devoid of irregularities or roughness.

[3-2 System Configuration]

Figure 6:
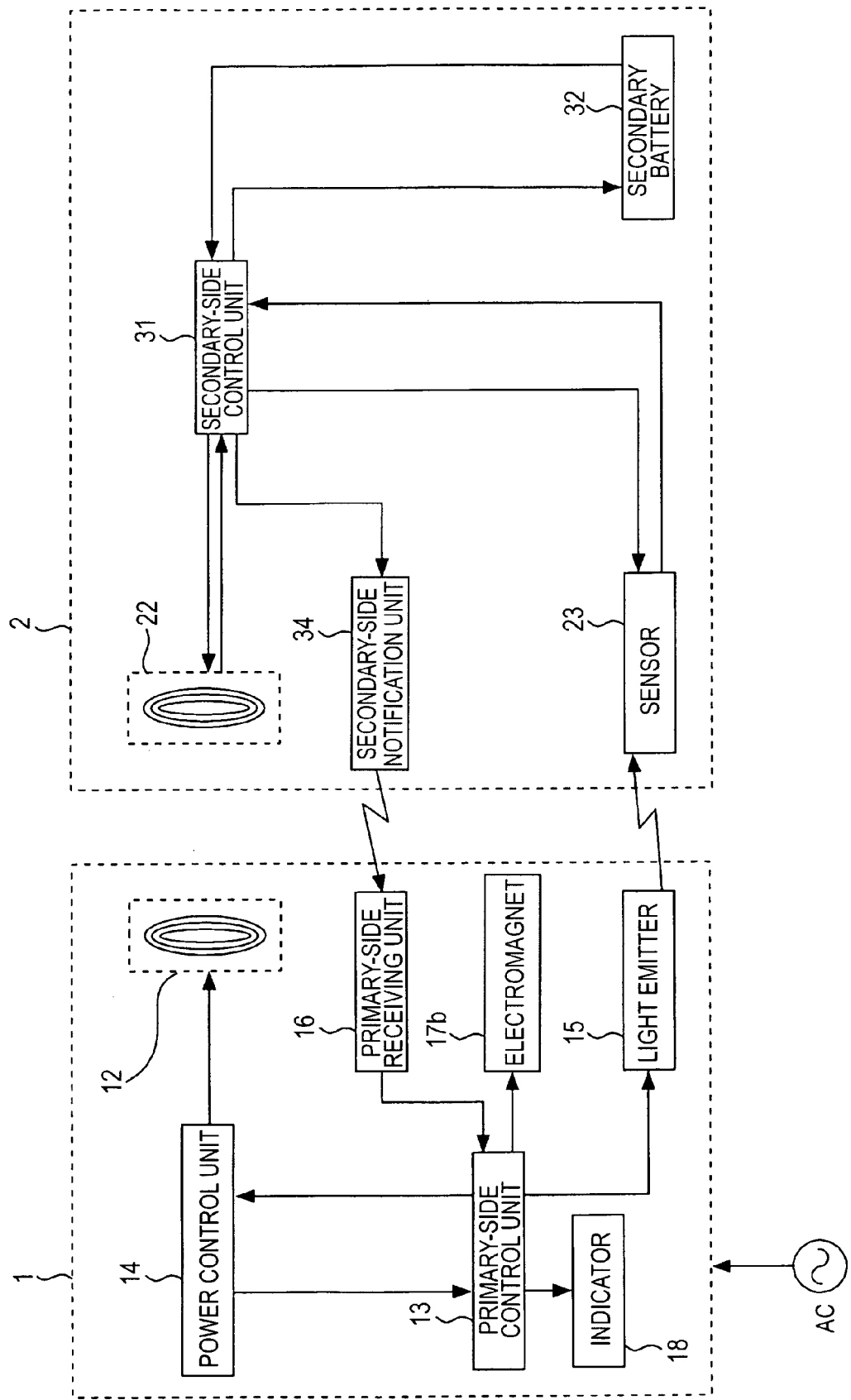
FIG. 6 is a block diagram showing an example of a system configuration for the charger and equipment to be charged in accordance with the second embodiment.

FIG. 6 shows an example of a system configuration for the charger 1 and equipment to be charged 2 in accordance with the second embodiment.

In the drawing, the same reference numerals are assigned to components identical to those shown in FIG. 3. An iterative description will be omitted.

As for the configuration of the charger 1 in accordance with the second embodiment, as illustrated, the charger 1 has the electromagnet 17b thereof driven by the primary-side control unit 13. The configuration of the equipment to be charged 2 is identical to that shown in FIG. 3.

[3-3 Algorithm]

Figure 7:
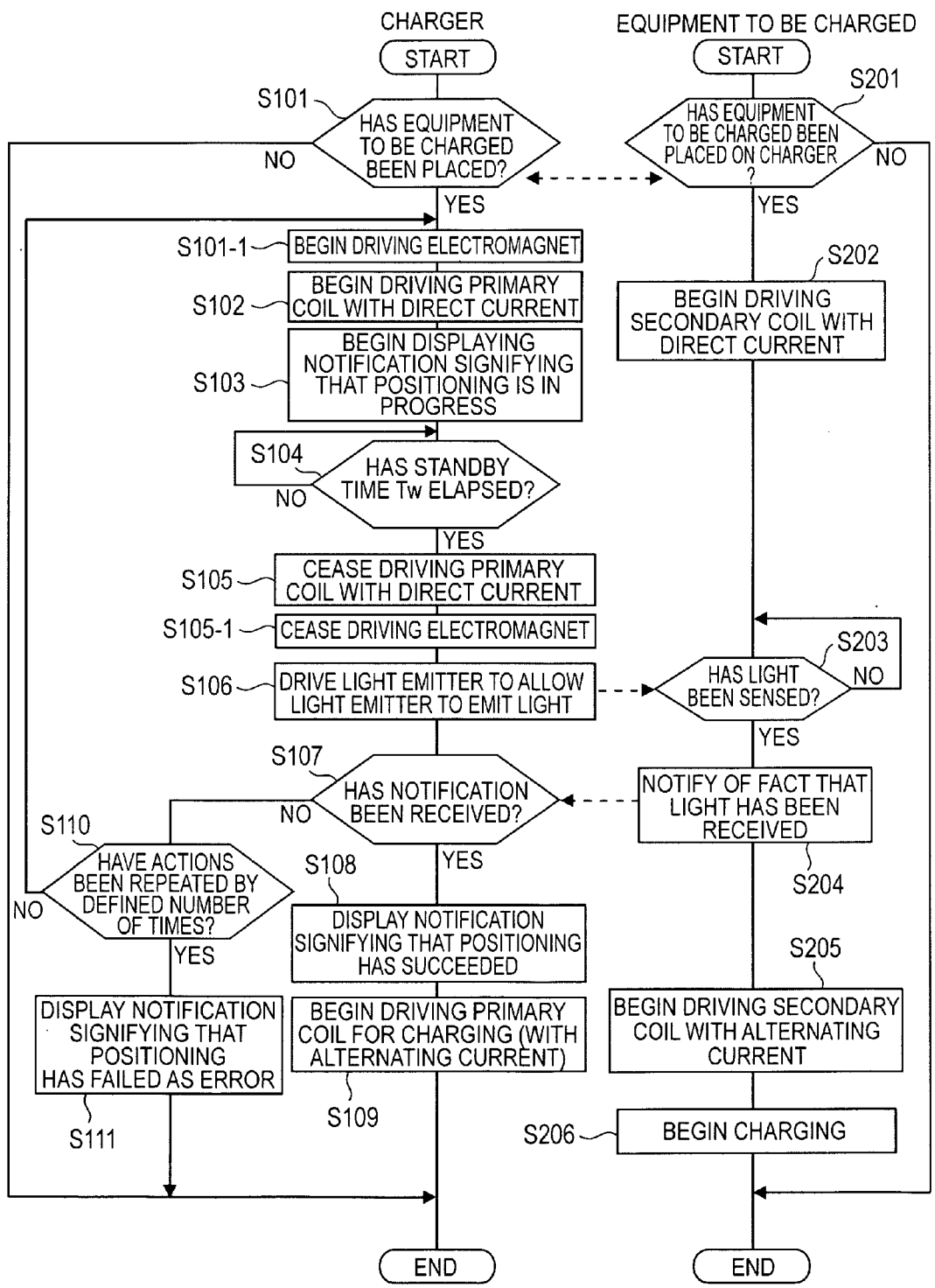
FIG. 7 is a flowchart showing an example of a processing procedure for primary-coil positioning control to be executed by the charger and equipment to be charged in accordance with the second embodiment.

The flowchart of FIG. 7 shows an example of a processing procedure to be followed by the charger 1 and equipment to be charged 2 in accordance with the second embodiment for the purpose of positioning control. Even in this drawing, the same step numbers are assigned to steps (pieces of processing) having the same contents at those shown in FIG. 4. An iterative description will be omitted.

As additional processing to be performed by the charger 1 and shown in the drawing, when a decision is made at step S101 that the equipment to be charged 2 has been placed on the charger 1, driving the electromagnet 17b is begun at step S101-1.

Driving the primary coil with a direct current is ceased at step S105. Concurrently, ceasing driving of the electromagnet 17b begun at step S101-1 is performed as additional processing at step S105-1.

The steps other than the step S101-1 and step S105-1 to be executed by the charger 1 are identical to those shown in FIG. 4.

The pieces of processing to be performed by the equipment to be charged 2 are identical to those shown in FIG. 4.

According to the foregoing algorithm, when a decision is made at step S101 that the equipment to be charged 2 has been placed on the charger 1, the primary coil 12 is driven with a direct current at step S102, and the electromagnet 17b is driven at step S101-1. This causes the primary coil moving mechanism 17 to function as described in conjunction with FIG. 5. The primary coil 12 is made movable in planar directions. In this state, the primary-side control unit stands by over the standby time Tw at step S104. At this time, since the secondary coil 22 of the equipment to be charged 2 is driven with a direct current at step S202, attraction is exerted between the primary coil 12 and secondary coil 22. Therefore, during a period corresponding to the standby time Tw, the primary coil 12 moves to approach the secondary coil 22 while being attracted to the secondary coil.

After the standby time Tw elapses at step S104, driving the electromagnet 17b is ceased at step S105-1, and driving the primary coil 12 with a direct current is switched to driving with an alternating current at step S106. Therefore, the attraction between the primary coil 12 and secondary coil 22 disappears. Further, repulsion between the primary coil 12 and electromagnet 17b disappears. Eventually, the substrate 11 to which the primary coil 12 is attached stands still due to the own weight. The position of the substrate 11 is finalized.

The pieces of processing succeeding step S107 are identical to those shown in FIG. 4. In addition, the pieces of processing succeeding step S203 and being performed by the equipment to be charged 2 are identical to those shown in FIG. 4.

In the second embodiment and aforesaid first embodiment, display of a notification to be performed at step S103 in order to indicate that positioning is in progress, display of a notification to be performed at step S108 in order to indicate that positioning has succeeded, and display of a notification to be performed at step S111 in order to indicate that positioning has failed as an error are achieved using the indicator 18 composed of light-emitting elements, for example, LEDs. However, when the charger 1 is provided with a device capable of achieving more advanced display, such as, a liquid crystal display unit, the notifications can be displayed according to, for example, the segment display method or the matrix driving image display method.

In the second embodiment and aforesaid first embodiment, charging-related display may be carried out by the equipment to be charged 2 (not shown in FIGS. 4 and 7). Conceivable as display to be performed by the equipment to be charged 2 is display indicating that charging is in progress and being performed when charging is begun at step S206. Further, display indicating that the secondary battery 32 has been fully charged may be performed as a result of monitoring an amount of charge stored in the secondary battery 32. The display may be achieved by, for example, lighting an LED or the like. Otherwise, a liquid crystal display unit or the like may be used to provide display indicating stepwise the amount of charge.

Further, in the second embodiment and aforesaid first embodiment, display of a notification to be performed at step S103 in order to indicate that positioning is in progress, display of a notification to be performed at step S108 in order to indicate that positioning has succeeded, and display of a notification to be performed at step S111 in order to indicate that positioning has failed as an error may be executed by the equipment to be charged 2.

As for the notification signifying that positioning is in progress, the equipment to be charged 2 may display it while performing driving of the secondary coil with a direct current at step S202. The notification signifying that positioning has succeeded may be displayed responsively to the fact that light has been sensed at step S203. As for the notification signifying that positioning has failed as an error, for example, after driving the secondary coil 22 with a direct current is begun at step S202, even when a predetermined time that is long enough to decide that a positioning error has occurred has elapsed, if light is not sensed at step S203, the notification may be displayed.

The foregoing notifications may be displayed using, for example, characters or icons. Further, the notifications may not be displayed but may be outputted in the form of a sound.

4. Third Embodiment

[4-1 System Configuration]

Figure 8:
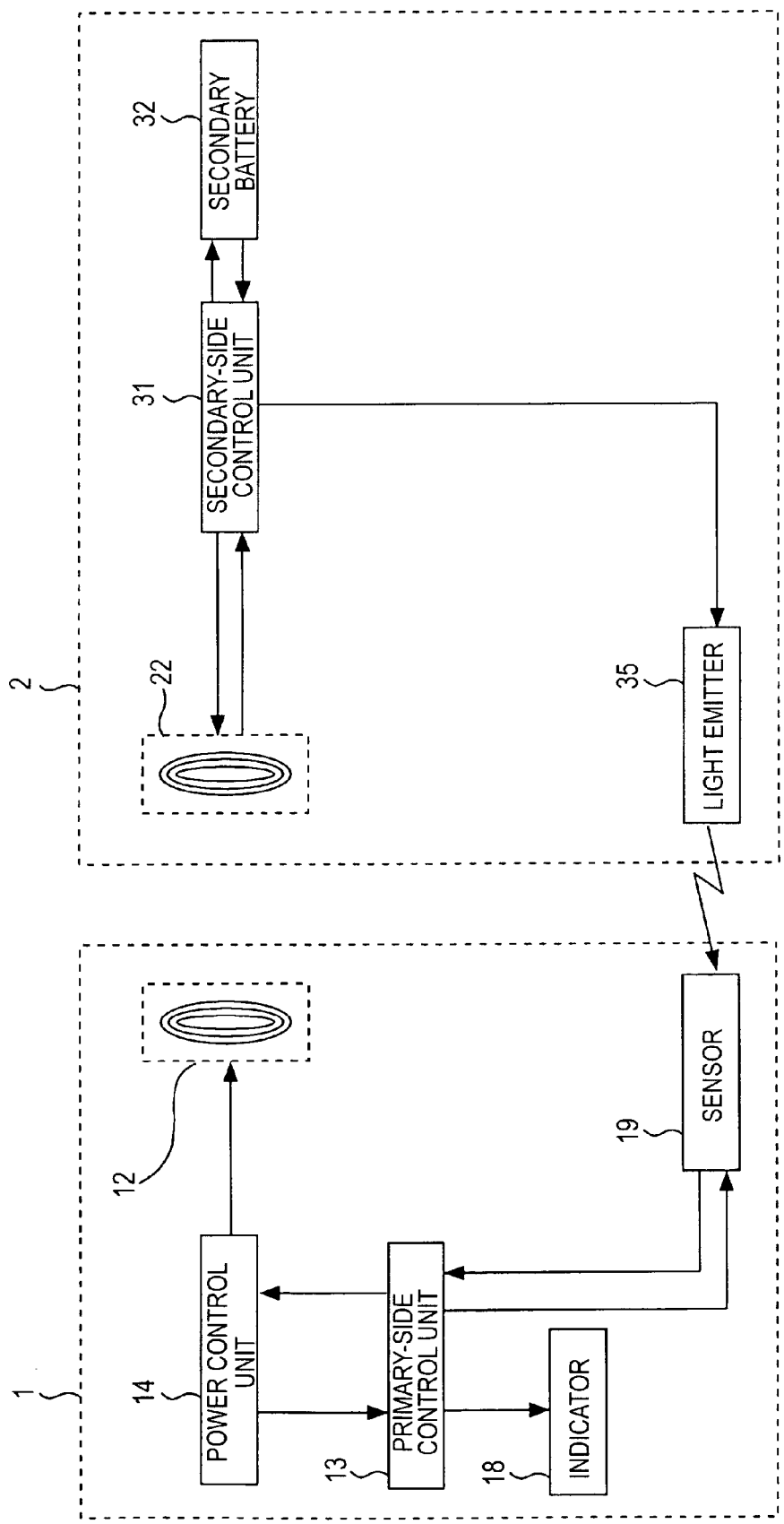
FIG. 8 is a block diagram showing an example of a system configuration for a charger and equipment to be charged in accordance with a third embodiment.

FIG. 8 shows an example of a system configuration for the charger 1 and equipment to be charged 2 in accordance with a third embodiment.

In the drawing, the same reference numerals are assigned to components identical to those shown in FIG. 3 and FIG. 6. An iterative description will be omitted.

In the system configuration of the third embodiment, the primary coil moving mechanism 17 has the structure that includes the spherical-pieces layer 17a and that is employed in the first embodiment.

However, the configuration of the third embodiment can be applied to a system in which the primary coil moving mechanism 17 includes the electromagnet 17b similarly to that employed in the second embodiment. In this case, the primary-side control unit 13 of the charger 1 drives the electromagnet 17b.

For example, in the aforesaid first and second embodiments, as shown in FIG. 1, FIG. 2, and FIG. 5, the charger 1 includes the light emitter 15, and the equipment to be charged 2 includes the sensor 23.

In contrast, in the third embodiment, the equipment to be charged 2 includes a light emitter 35, and the charger 1 includes a sensor 19.

The light emitter 35 is attached to the substrate 21 in place of the sensor 23 shown in FIG. 1, and the sensor 19 is attached to the substrate 11 in place of the light emitter 15, though a structural illustration is omitted.

In FIG. 8, the primary-side control unit 13 of the charger 1 conducts a current to the sensor 19 so as to thus actuate the sensor 19, and fetches a detection signal the sensor 19 outputs after sensing light.

In the equipment to be charged 2, the light emitter 35 is driven to emit light by the secondary-side control unit 31.

The communication means that notifies the fact that receipt of light has been sensed and is shown in FIG. 3 and FIG. 6 to include the primary-side receiving unit 16 of the charger 1 and the secondary-side notification unit 34 of the equipment to be charged can be excluded.

In the third embodiment, since the communication means can be excluded, the internal configurations of the charger 1 and equipment to be charged 2 can be simplified accordingly. Therefore, the freedom in designing can be expanded, and a reduction in cost can be expected.

[4-2 Algorithm (First Example)]

The first example of an algorithm to be followed by the charger 1 and equipment to be charged 2 included in the third embodiment having the aforesaid system configuration will be described below.

Figure 9:
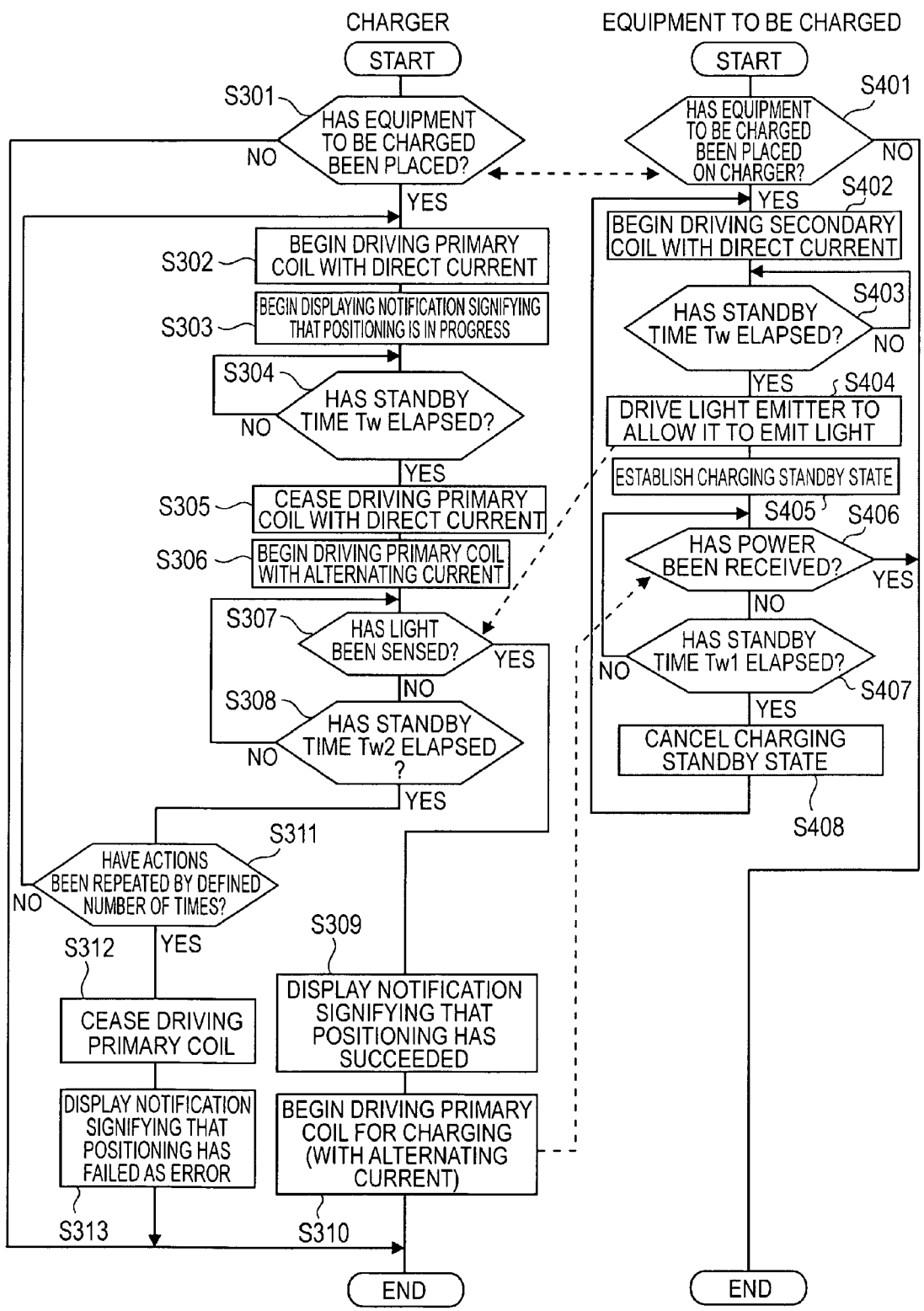
FIG. 9 is a flowchart showing an example of a processing procedure (first example of an algorithm) for primary-coil positioning control to be executed by the charger and equipment to be charged in accordance with the third embodiment.

The flowchart of FIG. 9 shows as the algorithm of the first example an example of a processing procedure to be followed by the charger 1 and equipment to be charged 2.

The pieces of processing to be performed by the charger 1 (primary-side control unit 31) at step S301 to step S305 are identical to those shown in FIG. 4.

At step S306, driving the primary coil 12 with an alternating current is begun. In conjunction with FIG. 4, a description has been made of a case where driving the primary coil 12 with an alternating current may be begun at a step preceding a step at which a decision is made that positioning has succeeded. In FIG. 9, the case is explicitly described as step S306.

In the equipment to be charged 2, when the secondary-side control unit 31 decides at step S401 that the equipment to be charged has been placed on the charger, the secondary-side control unit 31 drives the secondary coil 22 with a direct current at step S402. Concurrently, in the third embodiment, at step S403, the secondary-side control unit stands by until the standby time Tw elapses.

The processing of step S403 is, similarly to the processing of step S402, regarded as the processing that is immediately performed when a positive result of decision is obtained at step S401. Likewise, the processing of step S304 to be performed by the charger 1 is, similarly to the pieces of processing of step S302 and step S303, regarded as the processing to be immediately performed when a positive result of decision is obtained at step S301. In other words, the timing at which the standby over the standby time Tw begun by the charger 1 at step S304 is terminated nearly coincides with the timing at which the standby over the standby time Tw begun by the equipment to be charged 2 at step S403 is terminated.

When the standby time Tw elapses at step S403, the secondary-side control unit 31 of the equipment to be charged 2 drives at step S404 the light emitter 35 so as to thus allow the light emitter 35 to emit light over a certain time length.

When the standby time Tw elapses at step S304, the primary-side control unit 13 of the charger 1 switches the driving of the primary coil 12 with a direct current to the driving thereof with an alternating current at step S305 and step S306, and then proceeds to step S307. At step S307 and step S308, the primary-side control unit 13 stands by over a standby time Tw2 of a predetermined time length until light is sensed by the sensor 19. The processing of step S307 is recognized as being immediately performed when the pieces of processing of step S305 and step S306 are carried out after the standby time Tw elapses at step S304. Therefore, the timing at which the light emitter 35 included in the equipment to be charged 2 begins emitting light at step S404 nearly coincides with the timing at which deciding whether light is sensed is begun at step S307.

To be more specific, the execution time for the pieces of processing of step S302 to step S305 can be predesignated, that is, can be obtained as a known value. The standby time Tw that elapses at step S403 is designated in consideration of the execution time for the pieces of processing of step S302 to step S305 and the processing time that elapses at step S402 (in this case, the standby time may not be equal to the standby time Tw that elapses at step S304). Thus, the timing of step S307 coincides with the timing of step S404. Therefore, the timing at which the standby over the standby time Tw begun at step S304 is terminated nearly coincides with the timing at which the standby over the standby time Tw begun by the equipment to be charged 2 at step S403 is terminated.

The standby time Tw2 that elapses at step S308 is designated to be equal to the time length from when the light emitter 35 is driven to emit light at step S404 as processing to be performed in the equipment to be charged 2 to when a standby time Tw1 elapses at step S407.

In the charger 1, when light is sensed by the sensor 19 until the standby time Tw2 elapses, a positive result of decision is obtained at step S307. The primary-side control unit proceeds to step S309 or a subsequent step.

When it says that a positive result of decision is obtained at step S307, it means that the deviation in a planar direction of the position of the primary coil 12 from the position of the secondary coil falls within the permissible range. At step S309, the primary-side control unit 13 drives the indicator 18 so that the fact that positioning has succeeded can be notified.

As long as a defined amount of current having a defined frequency has already flowed for charging at step S306, step S310 may be skipped. For example, when the primary coil is driven with an alternating current at step S306, if the defined amount of current or the defined frequency has not been designated for charging due to some restriction, the defined amount of current and the defined frequency are designated for charging at step S310.

Although the standby time Tw2 has elapsed, if light emanating from the light emitter 35 is not sensed, that is, if the deviation of the position of the primary coil 12 from the position of the secondary coil 22 exceeds the permissible range, the primary-side control unit proceeds to step S311.

At step S311, similarly to step S110 shown in FIG. 4, a decision is made on whether the number of times of repetition for the processing of making the primary coil 12 movable at step S302 to step S308 and the subsequent processing of deciding whether light is sensed has reached a defined number of times. As long as a negative result of decision is obtained at step S311, the primary-side control unit 13 proceeds to step S302.

In contrast, if a positive result of decision is obtained at step S311 because the number of times of repetition has reached the defined number of times, the primary-side control unit 13 proceeds to step S312. At step S312, driving the primary coil 12 with an alternating current is ceased. At step S313, similarly to step S111 in FIG. 4, the indicator 18 is driven in order to notify of the fact that positioning has failed as an error. The primary-side control unit then returns to step S302. Ceasing the driving with an alternating current at step S312 is processing of making preparations for driving of the primary coil with a direct current at step S302 included in a subsequent loop. For example, step S311 may be skipped, and the driving with an alternating current may be switched to the driving with a direct current at step S302.

In the equipment to be charged 2, the secondary-side control unit 31 begins driving the light emitter 35 so as to allow the light emitter 35 to emit light at step S404. At step S405, the secondary-side control unit 31 ceases driving the secondary coil 22 with a direct current, and sets the secondary coil 22 to a charging standby state.

What is referred to as the charging standby state is a state of a mode to be described below.

Specifically, the secondary coil 22 is made conducting so that once the secondary coil 22 and primary coil 12 are inductively coupled to each other, the secondary coil 22 can receive a current, that is, the secondary coil 22 can exert induced electromotive force. When the induced electromagnetic force is exerted in the secondary coil 22, an operating mode in which the secondary-side control unit 31 feeds a charging current to the secondary battery 32 using the induced electromotive force so as to thus charge the secondary battery 32 is designated. The foregoing conducting state is equivalent to, for example, a state in which the secondary coil 22 is driven with an alternating current at step S205 shown in FIG. 4.

In the equipment to be charged 2, the secondary-side control unit 31 sets the secondary coil 22 to the charging standby state at step S405. Whether the secondary coil 22 has received power is decided at step S406 until a decision is made at step S407 that the standby time Tw1 has elapsed. If the secondary coil 22 has received power, an alternating voltage and current corresponding to the power are inputted to the secondary-side control unit 31. At step S406, a decision is made by deciding whether an ac voltage is inputted from the secondary coil 22.

In this case, the charger 1 does not notify the equipment to be charged 2 of the fact that light has been received. However, as long as the deviation of the position of the primary coil 12 from the position of the secondary coil falls within the permissible range, the sensor 19 in the charger 1 can receive light emanating from the light emitter 35. A positive result of decision is obtained at step S307, and the primary coil 12 is driven with an alternating current for charging (S310). In the equipment to be charged 2, since the charging standby state is established at step S405, induced electromotive force is exerted in the secondary coil 22. A positive result of decision is obtained at step S406. In this case, the equipment to be charged 2 is retained in the charging standby state. The charging standby state is regarded as an operating mode in which if the secondary coil 22 can receive power, the secondary battery 32 can be charged. When the fact that the secondary coil has received power is sensed based on the result of decision obtained at step S406, charging the secondary battery 32 is begun properly.

In contrast, when the deviation of the position of the primary coil 12 from the position of the secondary coil 22 exceeds the permissible range, a necessary and sufficient degree of magnetic coupling is not attained between the primary coil 12 and secondary coil 22.

Even when the fact that the secondary coil has received power is recognized at step S406 and the secondary-side control unit stands by at step S407, a defined amount of induced electromotive force that should be induced for charging is unavailable. As a result, a negative result of decision is obtained at step S406, and a positive result of decision is obtained at step S407. In this case, the secondary-side control unit 31 cancels the charging standby state at step S408, and returns to step S402.

At this time, in the charger 1, even when the standby time Tw2 has elapsed at step S308, light is not sensed by the sensor 19 at step S307. The primary-side control unit therefore proceeds to step S311, and returns to step S302 as long as the number of times of repetition falls below the defined number of times.

The timing at which the primary-side control unit returns to step S302 nearly coincides with the timing at which the secondary-side control unit of the equipment to be charged 2 returns from step S408 to step S402. Namely, for the pieces of loop processing to be performed by the charger 1 and equipment to be charged 2 respectively, since the standby times Tw, Tw1, and Tw2 are designated, the processing times for the respective steps are known or can be designated. Therefore, the timings at which the charger 1 and equipment to be charged 2 begin the pieces of loop processing shown in FIG. 9 can be squared with each other.

As mentioned above, in the third embodiment, the light emitter is incorporated in the equipment to be charged 2, and the sensor is incorporated in the charger 1. Therefore, communication may not be performed in order to notify of the fact that light emanating from the light emitter has been sensed. Nevertheless, the operating timings of the charger 1 and equipment to be charged 2 can be nearly squared with each other, and proper positioning control can be implemented.

[4-3 Algorithm (Second Example)]

Figure 10:
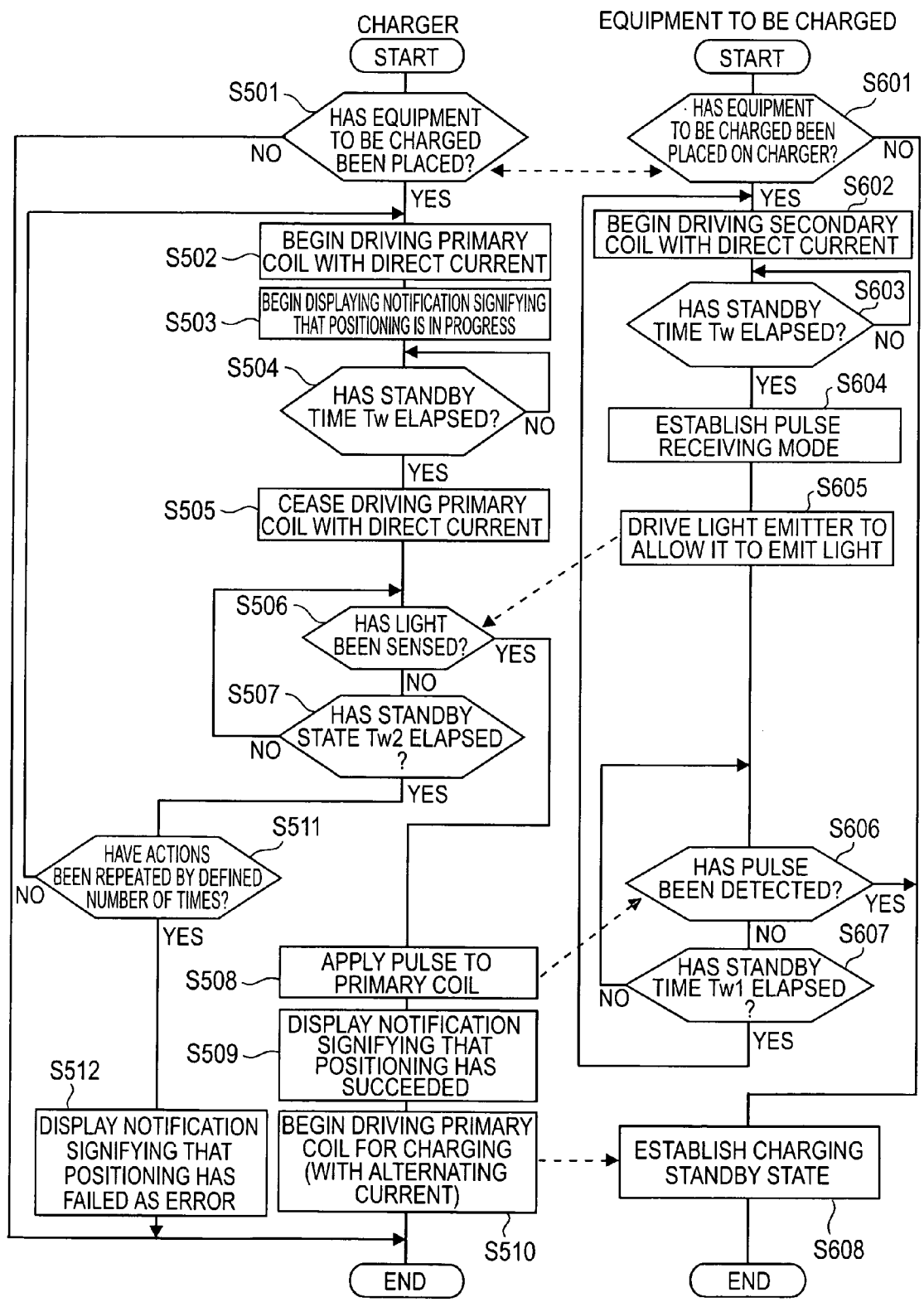
FIG. 10 is a flowchart showing an example of a processing procedure (second example of an algorithm) for primary-coil positioning control to be executed by the charger and equipment to be charged in accordance with the third embodiment.

The flowchart of FIG. 10 shows an example of a processing procedure as the second example of an algorithm to be followed by the charger 1 and equipment to be charged 2 in accordance with the third embodiment. According to the first algorithm, the charger 1 does not notify the equipment to be charged 2 of the fact that the sensor 19 has sensed light emanating from the light emitter 35. In contrast, according to the second example, the fact that the light has been sensed is notified by utilizing the magnetic coupling between the primary coil 12 and secondary coil 22.

In FIG. 10, the pieces of processing to be performed in the charger 1 at step S501 to step S505 are identical to those to be performed at step S301 to step S305 in FIG. 9. However, the processing to be performed at step S306 in order to begin driving the primary coil 12 with an alternating current at a step preceding a step at which positioning succeeds is not shown in FIG. 10. In this example, similarly to the aforesaid first and second embodiments, when positioning succeeds, driving the primary coil 12 with an alternating current is begun. In this case, conduction of a current to the primary coil 12 is ceased at step S505, but conduction thereof to the other regions including the control unit is carried on. The primary-side control unit proceeds to the processing of deciding during the standby time Tw2 whether light has been sensed which is performed at step S506 and step S507. The step S506 and step S507 correspond to the step S307 and step S308 in FIG. 9.

The pieces of processing to be performed in the equipment to be charged 2 at step S601 to step S603 are identical to those to be performed at step S401 to step S403 in FIG. 9. When the standby time Tw elapses at step S603, the secondary-side control unit 31 sets the secondary coil 22 to a pulse receiving mode at step S604. At step S605, similarly to step S405 in FIG. 9, the secondary-side control unit 31 drives the light emitter 35 so as to allow the light emitter 35 to emit light over a certain time.

What is referred to as the pulse receiving mode is a mode in which: the secondary coil 12 is brought to a conducting state; a pulse is induced by the secondary coil 22 responsively to application of a pulse to the primary coil 12 of the charger 1 at step S508; and the secondary-side control unit 31 detects the pulse induced by the secondary coil 22.

If a decision is made through step S506 and step S507 that light is not sensed in the charger 1 despite the elapse of the standby time Tw, the primary-side control unit proceeds to step S511. Step S511 is identical to step S311 in FIG. 9. As long as a negative result of decision is obtained, the primary-side control unit returns to step S502. If a positive result of decision is obtained, the primary-side control unit performs counter-error processing at step S512 similarly to step S313 in FIG. 9. In this case, when conduction of a current to the primary coil 12 is ceased at step S505, the conduction is kept ceased until positioning succeeds. The processing corresponding to that of step S312 in FIG. 9 is omitted.

In contrast, if a decision is made that the sensor 19 has sensed light until the standby time Tw elapses, that is, if the deviation in a planar direction of the position of the primary coil 12 from the position of the secondary coil 22 falls within the permissible range and power can be properly transmitted, the primary-side control unit proceeds to step S508 or a subsequent step.

At step S508, the primary-side control unit 13 applies a single pulse or plural consecutive pulses to the primary coil 12. Thereafter, similarly to step S309 and step S310 in FIG. 9, the primary-side control unit 13 drives the indicator 18, which is used to display the notification signifying that positioning has succeeded, at step S509 and step S510, and drives the primary coil 12 with an alternating current for charging.

In the equipment to be charged 2, the secondary-side control unit 31 designates the pulse receiving mode at step S604 and begins driving the light emitter 35 so as to allow the light emitter 35 to emit light at step S605. Thereafter, the secondary-side control unit 31 stands by over the standby time Tw1 at step S607 until a pulse induced by the secondary coil 22 is sensed at step S606.

Step S606 and step S607 are performed irrespective of whether the charger 1 has sensed light emanating from the light emitter 35. However, as long as the deviation of the position of the primary coil 12 from the position of the secondary coil 22 falls within the permissible range, the charger 1 applies a pulse to the primary coil 12 at step S508. Therefore, a pulsating voltage is induced by the secondary coil 22, and a positive result of decision is obtained at step S606. In this case, the secondary-side control unit 31 of the equipment to be charged 2 establishes the charging standby state at step S608. At this time, since the charger 1 has begun driving the primary coil 12 with an alternating current for charging at step S510, induced electromotive force is exerted in the secondary coil 22. Thereafter, the secondary battery 32 can be charged.

In contrast, when the deviation of the position of the primary coil 12 from the position of the secondary coil 22 exceeds the permissible range, the primary-side control unit included in the charger 1 proceeds from step S507 to step S511. No pulse is therefore applied to the primary coil 12. Eventually, no pulse is detected during the standby time Tw1 in the equipment to be charged 2, and the secondary-side control unit returns from step S607 to step S602.

As mentioned above, according to the algorithm of the second example employed in the third embodiment, a pulse is transferred between the primary coil 11 and second coil 22 for the purpose of notification. The communication means employed in the first and second embodiments is replaced with transfer of the pulse. Therefore, according to the algorithm of the second example, the operating timings of the charger 1 and equipment to be charged 2 can be nearly squared with each other without the necessity of the communication means. Proper positioning control is implemented.

In the embodiments shown in FIG. 1, FIG. 2, and FIG. 5, the light emitter 15 is laid on the primary coil 12 on the substrate 11, and the sensor 23 is laid on the secondary coil 22 on the substrate 21. However, as long as the positional relationship of the light emitter 15 to the movable primary coil 12 remains unchanged, the light emitter 15 may be disposed at a position in a planar direction at which the light emitter 15 does not come into contact with the primary coil 12. Accordingly, the sensor 23 may be disposed at a position at which the sensor 23 does not come into contact with the secondary coil 22.

The primary coil moving mechanism is not limited to the structures employed in the first and second embodiment respectively.

The primary-side receiving unit 16 and secondary-side notification unit 33 may be, for example, hardware devices independent of the light emitter 15 or sensor 23. Otherwise, a device having the capabilities of the light emitter 15 and primary-side receiving unit 16 may be adopted, and a device having the capabilities of the sensor 23 and secondary-side notification unit 33 may be adopted.

Unlike the embodiments, a constitution in which a coil moving mechanism is incorporated in equipment to be charged, and a coil is incorporated in a charger is conceivable. However, when a coil is movable in the charger, it is advantageous because a wider movable range can be preserved, and also advantageous in terms of versatility and universality. Since the equipment to be charged is often of a portable type, incorporation of a movable element in an internal circuit should be avoided from the viewpoint of, for example, durability.

As described previously, the constitutions for positioning control in accordance with the embodiments of the present invention are not especially limited to any specific equipment to be charged. The constitutions are effectively applied to pieces of electronic equipment including a device, which has a permanent magnet, therein or pieces of electronic equipment having a magnetic recording medium incorporated therein.

In this case, non-contact charging has been taken for instance. The embodiments are not limited to charging but may be applied to a system in which power is fed wirelessly or electronic equipment to which power is fed.

In addition, the embodiments can be applied to any electronic equipment other than typical electronic equipment that is regarded as power-receiving equipment. For example, the embodiments can be applied to non-contact charging to be performed on a secondary battery mounted in an automobile, for example, an electric automobile or a hybrid automobile. In this case, a charging facility includes a primary coil disposed on the ground or the like. An automobile is driven or moved to a place where the primary coil is installed, and then halted. With the automobile halted, induced electromotive force is exerted between the primary coil and a secondary coil mounted in the automobile in order to charge the secondary battery.

When the charging facility (power feeder) is utilized, it is very hard to accurately halt the automobile (power-receiving equipment) at a position in a charging place at which power is efficiently transmitted. When the constitution of any of the embodiments is adopted, even when the automobile is not halted at the exact position, power is optimally transmitted. Even when the automobile is stopped, since a driver may not be concerned about positioning, the user will find the constitution easy to use.

It should be understood by those skilled in the art that various modifications, combinations, sub-combinations and alterations may occur depending on design requirements and other factors insofar as they are within the scope of the appended claims or the equivalents thereof.

What is claimed is:

1. A power feeding system comprising:
a power feeder; and
power-receiving equipment that receives power fed from the power feeder, wherein
the power feeder includes
a mount on which the power-receiving equipment is placed,
a primary coil,
a moving means that makes the primary coil movable,
a query output means that is disposed so that the positional relationship to the movable primary coil remains unchanged, and outputs a query to outside using a predetermined medium,
a receiving means that when the query is sensed by the power-receiving equipment, receives notification information outputted from the power-receiving equipment,
a primary coil direct-current driving control means that when the power-receiving equipment is placed on the mount, as long as the primary coil is made movable by the moving means, controls the primary coil so that the primary coil is driven with a direct current over a certain time length,
a query control means that after driving the primary coil with a direct current is begun, allows the query output means to output a query, and
a primary coil alternating-current driving control means that after the notification information outputted from the power-receiving equipment in response to the query outputted by the query control means is received by the receiving means, controls the primary coil so that the primary coil can be driven with an alternating current, and
the power-receiving equipment includes
a secondary coil incorporated to be stationary in the power-receiving equipment,
a sensing means that is disposed at a position in the power-receiving equipment at which when the positional relationship between the primary coil and secondary coil falls within a proper range, the sensing means can sense the query,
a secondary coil direct-current driving control means that when the power-receiving equipment is placed on the power feeder, controls the secondary coil so that the secondary coil is driven with a direct current in order to exert attraction with respect to the primary coil which is driven with a direct current,
a notification information output means that after the driving with a direct current is begun by the secondary coil direct-current driving control means, when the query is sensed by the sensing means, outputs the notification information, and
a secondary coil alternating-current driving control means that after the driving with a direct current is begun by the secondary coil direct-current driving control means, when the query is sensed by the sensing means, controls the secondary coil so that electromotive force induced by the primary coil which is driven with an alternating current is exerted.

2. The power feeding system according to claim 1, wherein in the power feeder, when the notification information responding to the query outputted by the query control means is not received by the receiving means, the primary coil direct-current driving control means re-executes the driving of the primary coil with a direct current over the certain time length; and after the re-executed driving of the primary coil with a direct current is begun, the query control means allows the query output means to output a query again.

3. The power feeding system according to claim 1 or 2, wherein when the query is outputted by the query control means, the primary coil direct-current driving control means ceases the driving of the primary coil with a direct current.

4. The power feeding system according to claims 1 or 2, wherein the moving means includes a movable member having the primary coil, and a movable member bearing region located below the movable member; and friction between the movable member and movable member bearing region is reduced to such an extent that the primary coil can be moved with the attraction exerted between the primary coil and secondary coil.

5. The power feeding system according to claims 1 or 2, wherein the mount includes an electromagnet, further comprising:

an electromagnet driving means that when the primary coil is driven with a direct current by the primary coil direct-current driving control means, drives the electromagnet so that repulsion is exerted with respect to the primary coil.

6. The power feeding system according to claims 1 or 2, wherein the mount is structured to have a plurality of spherical pieces arranged in planar directions.

7. The power feeding system according to claims 1 or 2, wherein the query output means outputs a query using light as the medium; and the sensing means senses the light.

8. The power feeding system according to claims 1 or 2, wherein the power-receiving equipment includes a charging means that charges the secondary battery by utilizing the induced electromotive force exerted in the secondary coil.

9. A power feeding system comprising:

a power feeder; and power-receiving equipment that receives power fed from the power feeder, wherein the power feeder includes a mount on which the power-receiving equipment is placed, a primary coil, a moving means that makes the primary coil movable, a sensing means disposed so that the positional relationship to the movable primary coil remains unchanged, and located at a position at which when the positional relationship between the primary coil and a secondary coil incorporated in the power-receiving equipment falls within a proper range, the sensing means can sense a query outputted from the power-receiving equipment, a primary coil direct-current driving control means that when the power-receiving equipment is placed on the mount, as long as the primary coil is made movable by the moving means, controls the primary coil so that the primary coil is driver with a direct current over a certain time length, and a primary coil alternating-current driving control means that after driving the primary coil with a direct current is begun, when the query is sensed by the sensing means, controls the primary coil so that the primary coil can be driven with an alternating current, and the power-receiving equipment includes a secondary coil incorporated to be stationary in the power-receiving equipment, a query output means that outputs the query to outside using a predetermined medium so that whether the positional relationship between the primary coil and secondary coil falls within the proper range can be decided, a secondary coil direct-current driving control means that when the power-receiving equipment is placed on the power feeder, controls the secondary coil so that the secondary coil is driven with a direct current over the certain time length in order to exert attraction with respect to the primary coil which is driven with a direct current, a query control means that after the secondary coil is driven with a direct current by the secondary coil direct-current driving control means, allows the query output means to output the query, and a secondary coil alternating-current driving control means that after the secondary coil is driven with a direct current by the secondary coil direct-current driving control means, controls the secondary coil so that electromotive force induced by the primary coil which is driven with an alternating current is exerted.

10. The power feeding system according to claim 9, further comprising a pulse application means that is incorporated in the power feeder, and that when the query is sensed by the sensing means, applies a pulse to the primary coil, and a pulse sensing means that is incorporated in the power-receiving equipment, and that senses a pulsating voltage induced by the secondary coil responsively to the application of the pulse to the primary coil by the pulse application means, wherein when the pulse is sensed by the pulse sensing means, the secondary coil alternating-current driving control means controls the secondary coil so that the electromotive force induced by the primary coil which is driven with an alternating current is exerted.

11. A power feeder comprising:

a mount on which power-receiving equipment is placed;

a primary coil;

a moving means that makes the primary coil movable;

a query output means that is disposed so that the positional relationship to the movable primary coil remains unchanged, and outputs a query to outside using a predetermined medium;

a receiving means that assuming that the positional relationship between the primary coil and a secondary coil incorporated to be stationary in the power-receiving equipment falls within a proper range, when the query is sensed by the power-receiving equipment, receives notification information outputted from the power-receiving equipment;

a primary coil direct-current driving control means that when the power-receiving equipment is placed on the mount, as long as the primary coil is made movable by the moving means, controls the primary coil so that the primary coil is driven with a direct current over a certain time length in order to exert attraction with respect to the secondary coil which is driven with a direct current in the power-receiving equipment;

a query control means that after driving the primary coil with a direct current is begun, allows the query output means to output the query; and a primary coil alternating-current driving control means that after the notification information outputted from the power-receiving equipment in response to the query outputted by the query control means is received by the receiving means, controls the primary coil so that the primary coil can be driven with an alternating current.

12. Power-receiving equipment comprising:

a secondary coil incorporated to be stationary in the power-receiving equipment;

a sensing means located at a position at which when the positional relationship between a primary coil incorporated to be movable in a power feeder and the secondary coil falls within a proper range, the sensing means can sense a query outputted from the power feeder;

a secondary coil direct-current driving control means that when the power-receiving equipment is placed on the power feeder, controls the secondary coil so that the secondary coil is driven with a direct current in order to exert attraction with respect to the primary coil which is driven with a direct current in the power feeder;

a notification information output means that after the driving with a direct current is begun by the secondary coil direct-current driving control means, when the query is sensed by the sensing means, outputs notification information; and a secondary coil alternating-current driving control means that after the driving with a direct current is begun by the secondary coil direct-current driving control means, when the query is sensed by the sensing means, controls the secondary coil so that electromotive force induced by the primary coil which is driven with an alternating current is exerted.

13. A power feeder comprising:

a mount on which power-receiving equipment is placed;

a primary coil;

a moving means that makes the primary coil movable;

a sensing means disposed so that the positional relationship to the movable primary coil remains unchanged, and located at a position at which when the positional relationship between the primary coil and a secondary coil incorporated to be stationary in the power-receiving equipment falls within a proper range, the sensing means can sense a query outputted from the power-receiving equipment;

a primary coil direct-current driving control means that when the power-receiving equipment is placed on the mount, as long as the primary coil is made movable by the moving means, controls the primary coil so that the primary coil is driven with a direct current over a certain time length in order to exert attraction with respect to the secondary coil which is driven with a direct current in the power-receiving equipment; and a primary coil alternating-current driving control means that after driving the primary coil with a direct current is begun, when the query is sensed by the sensing means, controls the primary coil so that the primary coil can be driven with an alternating current.

14. Power-receiving equipment comprising:

a secondary coil incorporated to be stationary in the power-receiving equipment;

a query output means that outputs a query to outside using a predetermined medium so that whether the positional relationship between a primary coil incorporated in a power feeder and the secondary coil falls within a proper range can be decided;

a secondary coil direct-current driving control means that when the power-receiving equipment is placed on the power feeder, controls the secondary coil so that the secondary coil is driven with a direct current over a certain time length in order to exert attraction with respect to the primary coil which is driven with a direct current;

a query control means that after the secondary coil is driven with a direct current by the secondary coil direct-current driving control means, controls the secondary coil so that electromotive force induced by the primary coil which is driven with a direct current is exerted; and a secondary coil alternating-current driving control means that after the secondary coil is driven with a direct current by the secondary coil direct-current driving control means, controls the secondary coil so that electromotive force induced by the primary coil which is driven with an alternating current is exerted.

15. A positioning control method to be implemented in a power feeding system including a power feeder and power-receiving equipment that receives power fed from the power feeder, the method comprising the steps of:

when a query is sensed by the power-receiving equipment, allowing the power feeder to receive notification information outputted from the power-receiving equipment;

when the power-receiving equipment is placed on the power feeder, as long as the primary coil is made movable by a moving unit which makes the primary coil movable, allowing the power feeder to control a primary coil so that the primary coil is driven with a direct current over a certain time length;

after driving the primary coil with a direct current is begun, allowing a query output unit, which is disposed in the power feeder so that the positional relationship to the primary coil which is made movable by the moving unit remains unchanged, and outputs a query to outside using a predetermined medium, to output the query;

after the notification information outputted from the power-receiving equipment in response to the query outputted at the query control step is received at the receiving step, allowing the power feeder to control the primary coil so that the primary coil can be driven with an alternating current;

when the power-receiving equipment is placed on the power feeder, allowing the power-receiving equipment to control a secondary coil so that the secondary coil incorporated to be stationary in the power-receiving equipment is driven with a direct current in order to exert attraction with respect to the primary coil which is driven with a direct current;

after driving with a direct current is begun at the secondary coil direct-current driving control step, when the query is sensed by a sensing unit that is located at a position at which when the positional relationship between the primary coil and the secondary coil incorporated to be stationary in the power-receiving equipment falls within a proper range, the sensing unit can sense the query, allowing the power-receiving equipment to output the notification information; and after the driving with a direct current is begun at the secondary coil direct-current driving control step, when the query is sensed by the sensing unit, allowing the power-receiving equipment to control the secondary coil so that electromagnetic force induced by the primary coil which is driven with a direct current is exerted.

16. A positioning control method to be implemented in a power feeder, the method comprising the steps of:
when the positional relationship between the primary coil and a secondary coil incorporated to be stationary in the power feeder falls within a proper range, if a query outputted from a query output unit, which is disposed so that the positional relationship to a primary coil to be made movable by a moving unit that makes the primary coil movable remains unchanged, to outside using a predetermined medium is sensed by the power-receiving equipment, receiving notification information outputted from power-receiving equipment;
when the power-receiving equipment is placed on a mount, as long as the primary coil is made movable by the moving unit, controlling the primary coil so that the primary coil is driven with a direct current over a certain time length in order to exert attraction with respect to the secondary coil which is driven with a direct current in the power-receiving equipment;
after driving the primary coil is begun, allowing the query output unit to output a query; and
after the notification information outputted from the power-receiving equipment in response to the query outputted at the query control step is received at the receiving step, controlling the primary coil so that the primary coil can be driven with an alternating current.

17. A positioning control method to be implemented in power-receiving equipment, the method comprising the steps of:
when the power-receiving equipment is placed on a power feeder, controlling a secondary coil, which is incorporated to be stationary in the power-receiving equipment, so that the secondary coil is driven with a direct current in order to exert attraction with respect to a movable primary coil which is driven with a direct current in the power feeder;
after driving with a direct current is begun at the secondary coil direct-current driving control step, if a query is sensed by a sensing unit that is located at a position in the power-receiving equipment at which when the positional relationship between the primary coil of the power feeder and the secondary coil of the power-receiving equipment falls within a proper range, the sensing unit can sense the query outputted from the power feeder, outputting notification information; and
after the driving with a direct current is begun at the secondary coil direct-current driving control step, when the query is sensed by the sensing unit, controlling the secondary coil so that electromotive force induced by the primary coil which is driven with an alternating current is exerted.

18. A positioning control method to be implemented in a power feeding system including a power feeder and power-receiving equipment that receives power fed from the power feeder, the method comprising the steps of:
when the power-receiving equipment is placed on a mount of the power feeder, allowing the power feeder to control a primary coil, which is made movable by a moving unit that makes the primary coil movable, so that the primary coil is driven with a direct current over a certain time length;
after driving the primary coil with a direct current is begun, when a query is sensed by a sensing unit that is disposed so that the positional relationship to the movable primary coil remains unchanged and that is located at a position at which when the positional relationship between the primary coil and a secondary coil of the power-receiving equipment falls within a proper range, the sensing unit can sense the query sent from the power-receiving equipment, allowing the power feeder to control the primary coil so that the primary coil can be driven with an alternating current;
when the power-receiving equipment is placed on the power feeder, allowing the power-receiving equipment to control the secondary coil, which is incorporated to be stationary in the power-receiving equipment, so that the secondary coil is driven with a direct current over the certain time length in order to exert attraction with respect to the primary coil which is driven with a direct current;
after the secondary coil is driven with a direct current at the secondary coil direct-current driving control step, allowing a query output unit, which is included in the power-receiving equipment and outputs a query to outside using a predetermined medium, to output the query so that whether the positional relationship between the primary coil and secondary coil falls within a proper range can be decided; and
after the secondary coil is driven with a direct current at the secondary coil direct-current driving control step, allowing the power-receiving equipment to control the secondary coil so that electromotive force induced by the primary coil which is driven with an alternating current is exerted.

19. A positioning control method to be implemented in a power feeder, the method comprising the steps of:
when power-receiving equipment is placed on a mount of the power feeder, as long as a primary coil is made movable by a moving unit that makes the primary coil movable, controlling the primary coil so that the primary coil is driven with a direct current over a certain time length in order to exert attraction with respect to a secondary coil which is driven with a direct current in the power-receiving equipment; and
after driving the primary coil with a direct current is begun, when a query is sensed by a sensing unit that is disposed so that the positional relationship to the primary coil which is made movable by the moving unit remains unchanged and that is located at a position at which when the positional relationship between the primary coil and the secondary coil incorporated to be stationary in the power-receiving equipment falls within a proper range, the sensing unit can sense the query, controlling the primary coil so that the primary coil can be driven with an alternating current.

20. A positioning control method to be implemented in power-receiving equipment, the method comprising the steps of:
when the power-receiving equipment is placed on a power feeder, controlling a secondary coil, which is incorporated to be stationary in the power-receiving equipment, so that the secondary coil is driven with a direct current over a certain time length in order to exert attraction with respect to a movable primary coil which is driven with a direct current;
after the secondary coil is driven with a direct current at the secondary coil direct-current driving control step, allowing a query output unit, which outputs a query to outside using a predetermined medium, to output the query so that whether the positional relationship between the primary coil and secondary coil falls within a proper range can be decided; and after the secondary coil is driven with a direct current at the secondary coil direct-current driving control step, controlling the secondary coil so that electromotive force induced by the primary coil which is driven with an alternating current is exerted.

* * * * *